(12) United States Patent
Murdoch et al.

(10) Patent No.: US 8,810,371 B2
(45) Date of Patent: Aug. 19, 2014

(54) ANTENNA DESIGN AND INTERROGATOR SYSTEM

(75) Inventors: Graham Alexander Munro Murdoch, Wollstonecraft (AU); Stuart Colin Littlechild, Haberfield (AU); Aras Vaichas, Leichardt (AU)

(73) Assignee: Vicinity Pty Ltd, Clayton VIC (AU)

( * ) Notice: Subject to any disclaimer, the term of this patent is extended or adjusted under 35 U.S.C. 154(b) by 324 days.

(21) Appl. No.: 12/996,035

(22) PCT Filed: Jun. 11, 2009

(86) PCT No.: PCT/AU2009/000737
§ 371 (c)(1),
(2), (4) Date: Jan. 27, 2011

(87) PCT Pub. No.: WO2009/149506
PCT Pub. Date: Dec. 17, 2009

(65) Prior Publication Data
US 2011/0121945 A1    May 26, 2011

(30) Foreign Application Priority Data
Jun. 12, 2008    (AU) .................. 2008902946

(51) Int. Cl.
*H04Q 5/22*     (2006.01)
*G06K 7/00*     (2006.01)
*G06K 7/10*     (2006.01)

(52) U.S. Cl.
CPC .................. *G06K 7/0008* (2013.01); *G06K 7/10346* (2013.01)
USPC ...................... 340/10.1; 340/10.41

(58) Field of Classification Search
CPC .. H04B 1/3877; H04L 1/206; H04L 25/0206; H04L 27/2647; B61L 25/045; B61L 25/048; G01S 13/758; G06K 2017/007; G06K 7/0008; G06K 7/10346; G06Q 10/08; G07C 2009/0092; G07C 9/00103; G07C 9/00111; G08B 13/06; G08G 1/20; G08G 1/202; H04N 13/02; H04N 2213/001; H04N 5/2252
USPC ........................................ 340/10.1
See application file for complete search history.

(56) References Cited

U.S. PATENT DOCUMENTS

| | | | | |
|---|---|---|---|---|
| 4,912,471 | A | * | 3/1990 | Tyburski et al. ........... 340/10.34 |
| 5,153,583 | A | * | 10/1992 | Murdoch ................... 340/10.34 |
| 5,258,766 | A | | 11/1993 | Murdoch |
| 5,302,954 | A | | 4/1994 | Brooks et al. |
| 5,630,204 | A | * | 5/1997 | Hylton et al. ................. 725/116 |
| 5,737,330 | A | * | 4/1998 | Fulthorp et al. ............. 370/346 |
| 6,166,706 | A | | 12/2000 | Gallagher, III et al. |
| 6,701,137 | B1 | * | 3/2004 | Judd et al. ..................... 455/121 |
| 6,903,656 | B1 | | 6/2005 | Lee |
| 2003/0174099 | A1 | | 9/2003 | Bauer et al. |
| 2006/0291407 | A1 | * | 12/2006 | Johnson et al. ............... 370/294 |
| 2008/0218314 | A1 | * | 9/2008 | Van Eeden ................... 340/10.1 |
| 2008/0238679 | A1 | * | 10/2008 | Rofougaran et al. ...... 340/572.2 |

FOREIGN PATENT DOCUMENTS

| | | |
|---|---|---|
| CN | 101038985 A | 9/2007 |
| CN | 101416200 A | 4/2009 |
| EP | 1814059 A2 | 8/2007 |
| JP | 20020344228 A | 11/2002 |
| JP | 2006215870 A | 8/2006 |
| JP | 2007200155 A | 8/2007 |
| WO | WO-89/10030 A1 | 10/1989 |
| WO | WO-96/02954 A1 | 2/1996 |
| WO | WO-99/34526 A1 | 7/1999 |
| WO | WO-00/67395 A1 | 11/2000 |
| WO | WO-2004/019055 A1 | 3/2004 |
| WO | WO-2005/062421 A1 | 7/2005 |
| WO | WO-2005/083893 A1 | 9/2005 |
| WO | WO-2007/030861 A1 | 3/2007 |
| WO | WO-2007/094787 A1 | 8/2007 |
| WO | WO-2007103445 A2 | 9/2007 |

OTHER PUBLICATIONS

Mitrovic, Bayer, "International Search Report", for PCT/AU2009/000737, as mailed Sep. 18, 2009, 5 pages.

\* cited by examiner

Primary Examiner — Daniel Wu
Assistant Examiner — Emily C Terrell
(74) Attorney, Agent, or Firm — Winstead PC

(57) ABSTRACT

Where a single cable conveys bidirectional RF signals and bidirectional data using a data carrying DC power signal where the RF signals and the bidirectional data carrying DC power signal are separated using frequency selective networks. Alternatively a single cable conveys bidirectional RF signals and bidirectional data using a modulated RF data signal where the RF signals and the bidirectional modulated RF data signal are separated using frequency selective networks. A array of switchable antennas where RF switching elements are integral to the antennas is connected to the single cable and is powered by and communicated with through the cable. The array of switchable antennas can be arranged to produce an interrogation field in any of one, two or three dimensions by the antennas being arranged to provide for a series of parallel spaced conductors through which currents are sequentially switched in order to produce both tangential and normal magnetic field components. The spatial relationship of the sequentially switched currents is chosen to ensure that at different times a tangential and a normal magnetic field are produced at the same location. The conductors are preferably arranged in a planar fashion and the tangential and normal magnetic fields are produced above the planar surface. A single layer of parallel spaced conductors provides for one or two dimensional operations. Adding a second parallel layer of orthogonally oriented parallel spaced conductors provides three dimensional operations where currents are sequentially switched in both layers.

15 Claims, 26 Drawing Sheets

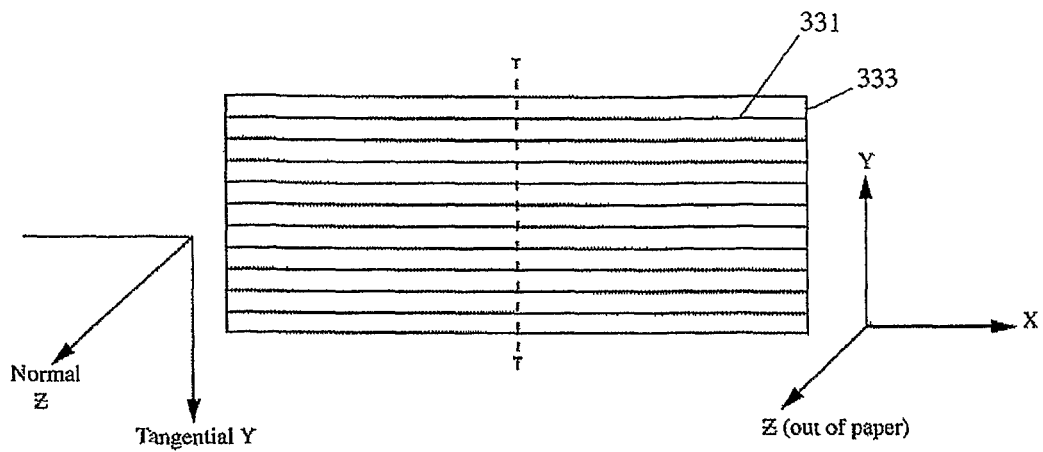
Fig 3a.
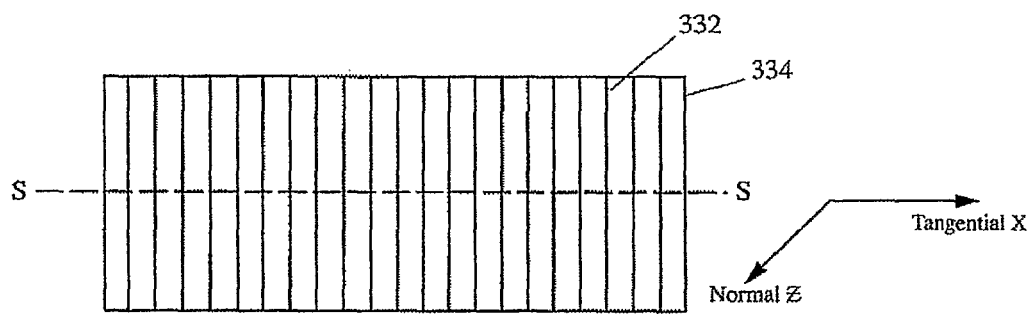
Fig 3b.
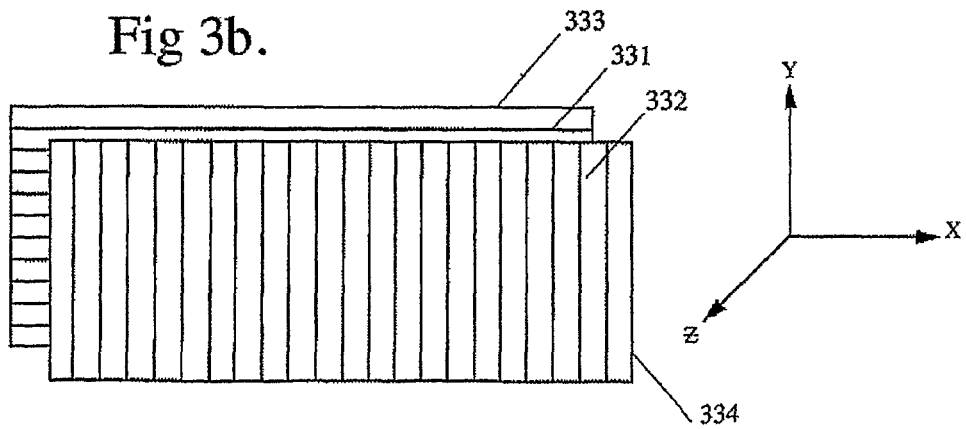

ANTENNA DESIGN AND INTERROGATOR SYSTEM

FIELD OF INVENTION

The present invention relates to the field of radio frequency identification (RFID).

In one form, the invention relates to an interrogator antenna for interrogating an RFID transponder.

The invention has been developed primarily for interrogating multiple passive transponders which are attached to objects to be identified by those respective transponders and will be described hereinafter with reference to that application. A typical application is the identification of RFID transponders or other RFID devices, such as those attached to documents or envelopes and embedded in plastic tokens or cards that are stacked on each other.

It will be convenient to hereinafter describe the invention in relation to identification of RFID transponders; however it should be appreciated that the present invention is not limited to that use only.

In one form, the invention provides a method by which data can be exchanged bi-directionally on a single cable between an interrogator and an RF signal control device. In another form, the invention provides a method of using a single cable port for controlling an RF signal and directing it to one of a number of output ports. In another form, the invention provides a way of controlling an RFID interrogation signal and directing it to one of many antenna coils. In another form, the invention provides a method by which data can be exchanged bi-directionally on a single cable between an interrogator and an antenna array in another form the invention relates to an interrogator including an arrangement of antenna coils with a single cable input port. In another form, the invention relates to a particular method of controlling antenna coils with a single cable input port. In another form, the invention relates to a method using a single cable input port for controlling antenna coils.

The present invention has many applications, including any application where antennas are used to radiate fields, especially for the purpose of interrogation of a remote device. In a particular application, the present invention may be used in conjunction with RFID devices, such as, by way of example only, RF transponders, tags, tokens, labels, inlets, etc. Such devices may be used in a wide variety of applications, including, without limitation, article tracking such as shelving and storage systems, document management or article identification and/or sorting, gaming apparatus and gaming tokens, jewellery and diamond display and/or identification and/or tracking and luggage identification.

It will be convenient to hereinafter describe the invention in relation to interrogating RFID devices, however it should be appreciated that the present invention is not limited to that use only.

BACKGROUND ART

Throughout this specification the use of the word "inventor" in singular form may be taken as reference to one (singular) inventor or more than one (plural) inventor of the present invention. The discussion throughout this specification comes about due to the realisation of the inventor(s) and/or the identification of certain prior art problems by the inventors.

Any discussion of documents, devices, acts or knowledge in this specification is included to explain the context of the invention. It should not be taken as an admission that any of the material forms a part of the prior art base or the common general knowledge in the relevant art in Australia or elsewhere on or before the priority date of the disclosure and claims herein.

It has been realised that in applications where RFID and remote powering is used and where orientation of the items to be identified cannot be guaranteed, such as shelving and storage systems, document tracking, luggage identification, gaming tokens, jewellery and diamond identification by way of example only, items to be identified may be missed and/or not correctly identified.

The applicants are aware of a number of transponder systems that provide one dimensional, two dimensional, limited three dimensional or full three dimensional capability. These systems utilise a multiplicity of interrogator coils operating in different coordinate axis, to achieve two or three dimensional operation.

One particularly advantageous interrogator design produces a uniform field in three dimensions. This form of interrogator is known as a Tunnel Reader Programmer (TRP). An example of a TRP for interrogating transponders on pallets or conveyors which meets all OH&S and EM regulations in Australia is disclosed in U.S. Pat. No. 5,258,766 and international application PCT/AU95/00436.

While a TRP has excellent three dimensional interrogation properties, a major drawback is that it is only suitable for applications where the RFID transponders are moved in and out of the TRP, usually on a conveyor or similar. TRP are inherently unsuitable for applications requiring the interrogation to occur on a flat surface such as a table or wall. For these applications flat planar antenna coils are required however these coils suffer from producing fields in only one direction at any point relative to the coil and do not have a two or three dimensional interrogation capability.

FIG. 1 illustrates a conventional planar antenna coil arrangement, in which the coil 10 has windings 11 arranged in a somewhat circular configuration.

FIG. 2 illustrates a cross sectional view X of FIG. 1 of the windings of the coil of FIG. 1. The magnetic field created by inducing power into the windings is represented 12. If a transponder 13 has a coil (not shown), but placed on it's outer top surface, for example, and if the transponder 13 is positioned substantially horizontally between the windings as illustrated in FIG. 2, the field 12 produced by the windings 11 has a correct orientation to power the transponder. Equally, if a transponder 14 is placed in a substantially vertical orientation as illustrated in FIG. 2, it too will be powered by the field 12. However, if a transponder 15 is placed substantially horizontally near or outside the windings 11, the field 12 generated by the windings will not be correctly oriented to power the transponder 15. Likewise if the transponder is placed in a substantially vertical orientation in the inside of the windings 11 and 12 as illustrated in 16 the field 12 generated by the windings will not be correctly oriented to power the transponder 15.

A flat planar arrangement of antenna coils which can provide two dimensional or three dimensional interrogation is shown in international application WO 2007/030861A1. WO 2007/030861A1 is incorporated here in by reference.

A one dimensional field can be generated over an extended area by overlapping planar coils that are switched in a sequential fashion. WO2007/030861A1 shows planar coils arranged in an overlapping fashion that are switched in a sequential fashion in order to generate a two dimensional interrogation field. WO 2007/030861A1 further shows that arranging a second layer of planar coils that are orthogonal to the first layer generates a three dimensional interrogation field. The coil antenna arrays for both the two dimensional and three dimensional operation are sequentially operated in order to provide their respective two and three dimensional interrogation fields.

FIG. 3(a) illustrates the prior art coil arrangement 333 and 334 of WO 2007/030861 A1 where the coil windings 331 and 332 from several coils have been overlapped in order to form a series of parallel spaced conductors through which currents are sequentially switched in order to produce both tangential and normal magnetic field components. The spatial relationship of the sequentially switched currents is chosen to ensure that at different times a tangential and a normal magnetic field are produced at the same location. The conductors are preferably arranged in a planar fashion and the tangential and normal magnetic fields are produced above the planar surface. A single layer of parallel spaced conductors provides for two dimensional operations.

FIG. 3(b) illustrates the prior art coil arrangement 333 of WO 2007/030861A1 where adding a second parallel layer 334 of orthogonally oriented parallel spaced conductors 332 provides three dimensional operations where currents are sequentially switched in both layers 331 and 332.

The amount of overlapping between the planar coils and the orthogonal coils can be adjusted to minimise the mutual coupling between the coils. This is advantageous as it reduces parasitic interactions between the coils. WO 89/10030 shows this method of minimising the mutual coupling between antenna coils which is advantageous for producing large arrays of many antennas.

Producing a two or three dimensional interrogation field and minimising the mutual coupling may be contradictory requirements and other methods of reducing the effective coupling between coils may be required. The parasitic coupling between antenna can be reduced by using a switched device, or multiple switched devices, to open inactive antenna coils. Switch devices can be relays, MEMs or PIN diodes or any other device capable of interrupting an RF signal. PIN diodes are circuit elements specifically designed for the purpose of providing a controllable RF switch. The method of using PIN diodes to open circuit RF signals is described for example in WO2007/030861A1, WO2005/083893, WO2005/062421 and WO2000/067395. Opening the circuit of inactive antenna coils reduces the parasitic coupling between coils as little or no current can flow through the open switch(s) in the inactive coil(s).

In order to sequentially operate the antenna arrays described in WO 2007/030861A1 the interrogating signal is sequentially switched to each antenna coil in the antenna array. An interrogator or reader with multiple outputs where the interrogation signal can be sequentially switched between the outputs is particularly advantageous for operating the antenna arrays described in WO 2007/030861A1.

An example of such a reader is shown in U.S. Pat. No. 6,903,656 which shows a reader where an antenna switch is located at the output of the reader. The antenna switch is integral to the reader and is directly controlled by the reader's digital controller. Multiple antennas are operatively connected to the antenna switch by connecting cables. U.S. Pat. No. 6,903,656 is directed towards antenna tuning methods and does not deal with the application of the switched interrogation signal for generating two or three dimensional interrogation fields.

There are applications where it is advantageous to move the antenna switch out of the reader and locate it remotely between the reader and the antennas connected to the switch. When positioned remotely the RF switch is called an RF multiplexer or RF MUX. The cable connections between the RF MUX and the antennas are considerably shorter. Remote positioning can save considerable cable length in installation since only a single cable connects the reader to the RF MUX replacing the multiple cables from the reader to each of the antenna that would have been required had the antenna switch been located in the reader.

WO2007/094787A1 shows an RF MUX where the RF MUX is located remotely from the reader and is connected to the reader by a single antenna cable. The single antenna cable is used to convey the interrogation signal, DC power to power the MUX, modulations of the interrogation signal to control the MUX's operation and information from the MUX sent back to the reader by RF backscatter of the interrogation signal. The output ports of the MUX are connected to antennas or other MUXs by further cable. The method of using the RF interrogation signal for controlling the MUX and sending information as a backscatter signal back from the MUX to the reader requires complex RF circuits that can couple to, demodulate and backscatter the interrogation signal. A serious disadvantage of the method of data signalling described in WO2007/094787A1 is the circuit complexity and cost.

Another problem exists whereby a person installing an RFID system and an antenna is coupled to a reader. However, the each antenna type has certain characteristics, and also each reader is usually configured to operate with a certain type of antenna. If an antenna is coupled to a reader, the reader should be configured to operate to that antenna type. However, this configuration is usually done manually, if it is done at all, and often, the configuration is not done correctly.

Any discussion of documents, devices, acts or knowledge in this specification is included to explain the context of the invention. It should not be taken as an admission that any of the material forms a part of the prior art base or the common general knowledge in the relevant art in Australia or elsewhere on or before the priority date of the disclosure and claims herein.

SUMMARY OF INVENTION

An object of the embodiments described herein is to provide a simpler and cheaper method of controlling a remote RF MUX using a single connecting cable for both the RF signals and the control signals.

Another object of the embodiments described herein is to provide a simpler and cheaper method of controlling an antenna array using a single connecting cable for both the RF signals and the control signals.

Yet another object of the embodiments described herein is to provide a antenna design and/or interrogator which is more likely to enable powering and/or communication with an RFID device.

A further object of the present invention is to alleviate at least one disadvantage associated with the prior art.

It is still a further object of the embodiments described herein to overcome or alleviate at least one of the above noted drawbacks of related art systems or to at least provide a useful alternative to related art systems.

The present invention provides, according to one aspect of invention, a communication method and/or device adapted to enable communication between a first device and a second device, comprising providing a $1^{st}$ signal representing a RF signal, providing a $2^{nd}$ signal representing a power signal, providing a third signal representing a control and/or data signal, providing a communication path adapted to carry the $1^{st}$, $2^{nd}$ and $3^{rd}$ signals, and wherein the 3rd signal is carried on the $1^{st}$ and/or $2^{nd}$ signal.

In one embodiment, the 3rd signal is carried on the $1^{st}$ signal.

In another embodiment, the 3rd signal is carried on the $2^{nd}$ signal.

The present invention provides, according to another aspect of invention, a method of and/or device for coupling a first device to a $2^{nd}$ device, comprising:

providing a communication path between the $1^{st}$ & $2^{nd}$ devices;

providing an identification attribute in the $1^{st}$ and/or $2^{nd}$ device, communicating the attribute between to $1^{st}$ & $2^{nd}$ devices and determining from the communication whether the $1^{st}$ & $2^{nd}$ devices are correctly coupled.

In one form, the invention relates to an identification system, and devices used in the system. Examples of the devices include transponders and/or apparatus adapted to be incorporated into items for storage on shelving and/or in storage systems. Another example of the devices includes transponders and/dr apparatus adapted to be incorporated into articles in a secure site, such as legal evidence samples which employ the use of a transponder and/or other identification device attached to the sample(s) for the purposes of monitoring and/or recording movements of the samples. Still another example of the devices includes tokens and/or apparatus adapted to be incorporated into gaming tables and/or devices.

In another form, the invention relates to a system for monitoring and/or recording gaming transactions in a casino, such as gaming transactions which employ the use of a gaming token which token has a transponder and/or other identification device therein.

In another form, the invention relates to a system for monitoring and/or recording jewellery or diamond movements or transactions, such as in an exchange, wholesaler or retailer where transactions which employ the use of a transponder and/or other identification device therein.

Preferably, a method of reading is substantially in accordance with PCT/AU 2003/001072.

Preferably, a method of reading is substantially in accordance with U.S. Pat. No. 5,302,954.

Preferably, a method of power, interrogating and/or communicating with an RFID device is substantially in accordance with WO 9934526.

Other aspects and preferred aspects are disclosed in the specification and/or defined in the appended claims, forming a part of the description of the invention.

In essence, an aspect of invention relates to communication between a first and second device, such as a switched antenna array connected to a reader by, preferably, a single cable. The single cable conveys RF signals and/or data (preferably bidirectionally, although communication in only one or both directions is also contemplated within the scope of the present invention) using a data carrying DC power signal where the RF signals and the data carrying DC power signal are separated. The manner of the separation may depend on the application. One preferred form of separation is using frequency selective networks. In one embodiment of the invention, an RE MUX is connected to the single cable and is powered by and communicated with through the cable. An array of antennas is connected to the RF MUX. The antennas and MUX circuits are integrated into a single switched antenna array where the RF switching elements are integral to the antennas. The array of switchable antennas can be arranged to produce an interrogation field in any of one, two or three dimensions by the antennas being arranged to provide for a series of parallel spaced conductors through which currents are sequentially switched in order to produce both tangential and normal magnetic field components. The spatial relationship of the sequentially switched currents is chosen to ensure that at different times a tangential and a normal magnetic field are produced at the same location. The conductors are preferably arranged in a planar fashion and the tangential and normal magnetic fields are produced above the planar surface. A single layer of parallel spaced conductors provides for one or two dimensional operations. Adding a second parallel layer of orthogonally oriented parallel spaced conductors provides three dimensional operations where currents are sequentially switched in both layers.

Alternatively, a communication method may be used between a $1^{st}$ & $2^{nd}$ device in which the $1^{st}$ device transmits a control or data signal to the $2^{nd}$ device using an RF signal which is modulated and/or switched. Corresponding receiving and/or demodulation circuitry is then provided in the $2^{nd}$ device in order to receive the control or data signals. In one form, the RF signal is switched off for short periods of time, and the envelope of the RF signal is detected by a diode peak detection circuit. In another form the frequency of the control or data RF signal is not the same as the frequency of the RF signal. Frequency selective circuits separate the control or data RF signal from the RF signal. In essence, another aspect of invention is related to the coupling of a first and second device. In this aspect of invention, an attribute of any suitable form is used to verify and/or to determine the extent of the coupling of the devices. For example, the attribute may be a signal, coding, sequence, data and/or a form of identification.

The present invention has been found to result in a number of advantages, such as:

Provides for using a single cable for conveying RF signals and data using a data carrying DC power signal Provides for using a single cable for conveying bidirectional RF signals and bidirectional data using a data carrying DC power signal Provides for a simple method of operating a remote RF MUX using only a single cable for conveying bidirectional RF signals and bidirectional data using a data carrying DC power signal Provides a simple planar antenna design which produces strong interrogation fields in one, two or three dimensions using a single cable for conveying bidirectional RF signals and bidirectional data using a data carrying DC power signal Provides a simple planar antenna design which produces strong interrogation fields in one, two or three dimensions where only a single cable connects the planar antenna to a reader.

Provides a simple planar antenna design which produces strong interrogation fields with reduced radio emissions in one, two or three dimensions where only a single cable connects the planar antenna to a reader Provides for a simple planar antenna ideally suited for table mounting or mounting to or as a flat surface onto which transponders may be place to be interrogated.

Depending upon the antenna design transponders can be interrogated regardless of their orientation in one, two or three dimensions.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Further disclosure, objects, advantages and aspects of the present application may be better understood by those skilled in the relevant art by reference to the following description of preferred embodiments taken in conjunction with the accompanying drawings, which are given by way of illustration only, and thus are not limitative of the present invention, and in which:

FIGS. 3(a) and 3(b) illustrates the prior art antenna coil arrangement of WO 2007/030861A1 for producing two and three dimensional interrogation fields.

DETAILED DESCRIPTION

Figure 1:
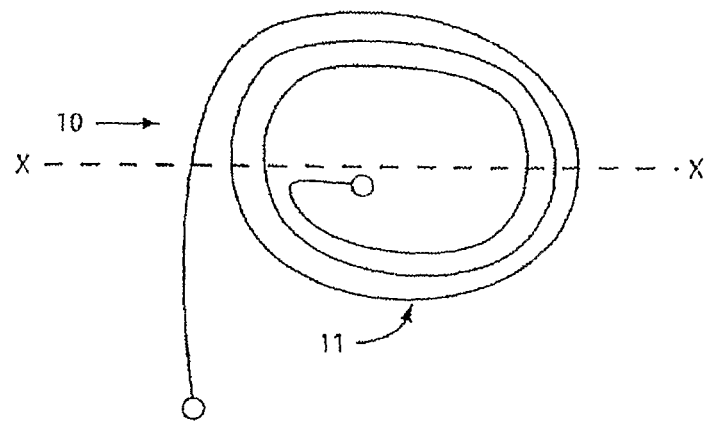
FIG. 1 illustrates a prior art antenna coil arrangement.
Figure 2:
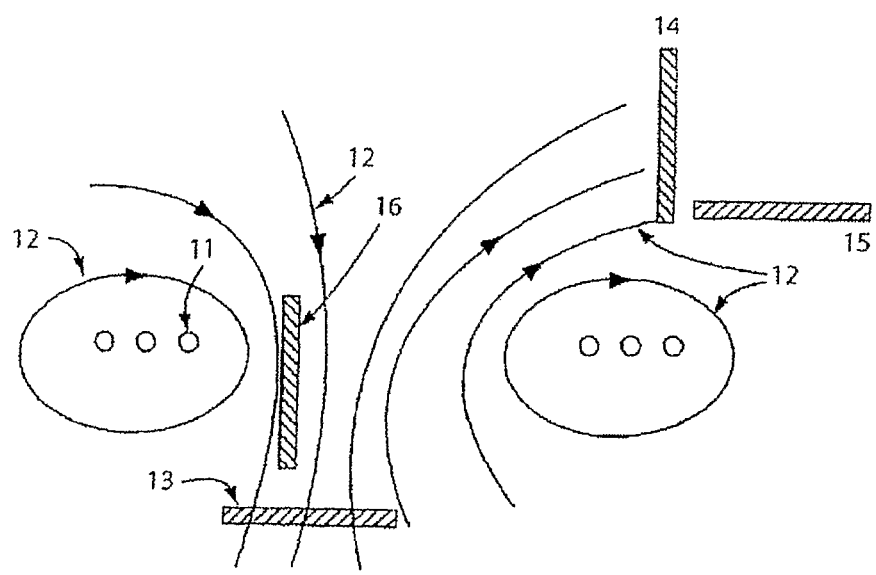
FIG. 2 illustrates magnetic fields associated with the coil of FIG. 1 as well as a number of transponder orientations.
Figure 4:
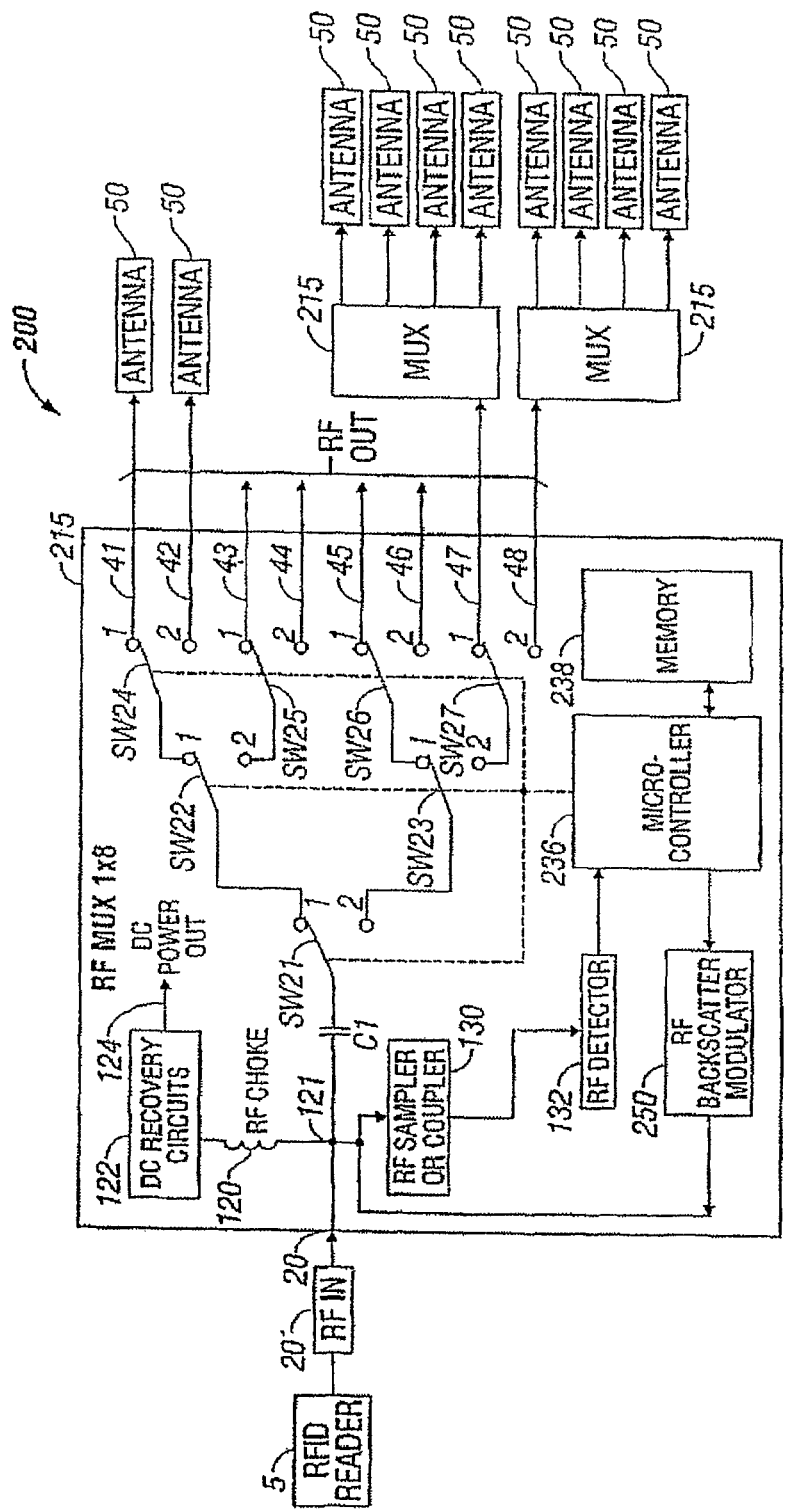
FIG. 4 illustrates the prior art RF MUX circuit of WO 2007/094787A1.

FIG. 4 illustrates the prior art RF MUX circuit of WO2007/094787A1. The prior art RF MUX circuit of WO2007/094787A1 uses a single antenna cable 20' to convey the interrogation signal, DC power 124 to power the MUX, modulations of the interrogation signal to control the MUX's operation and information from the MUX sent back to the reader by RF backscatter of the interrogation signal. The RF signals and DC power are separated using a frequency selective capacitor and inductor network 120 and C1. Bidirectional data is conveyed using the RF signal. The RF signal is modulated with data for the MUX where an RF coupler 130 and RF detector 132 extract and demodulate the data for the MUX. Data from the MUX is backscatter modulated 250 onto the RF signal and injected onto the cable 20' through the RF coupler 130. The RF coupler 130, detector 132 and backscatter circuit 250 are complex and add unnecessary cost to the RF MUX.

Figure 5A:
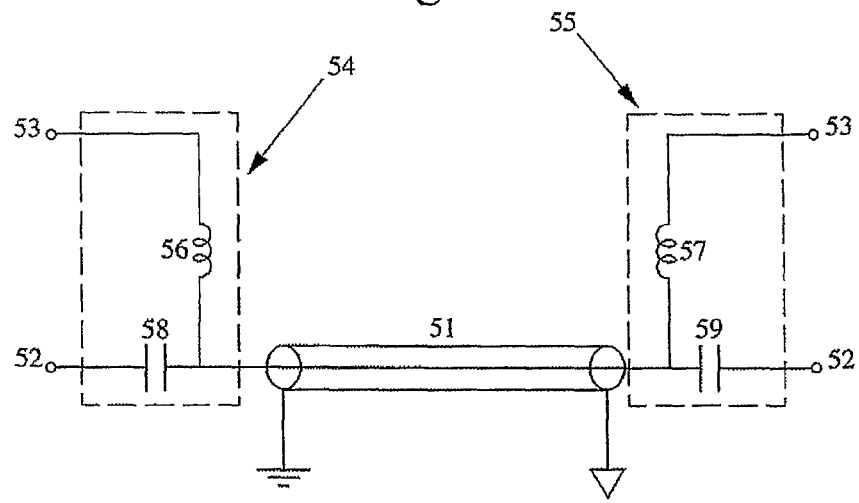
FIGS. 5(a) and 5(b) illustrate embodiments for using a single cable for conveying RF signals and DC power.

FIG. 5(a) illustrates an arrangement for using a single cable 51 for conveying RF signals 52 and DC power 53. The RF signals and DC power are combined and separated using a frequency selective capacitor and inductor networks 54 and 55 at each end of the cable. The inductors 56 and 57 pass DC and low frequencies while the capacitors 58 and 59 stop DC and low frequencies and pass high frequency RF signals. More complex frequency selective circuits may be used if better frequency characteristics are desired.

Figure 5B:
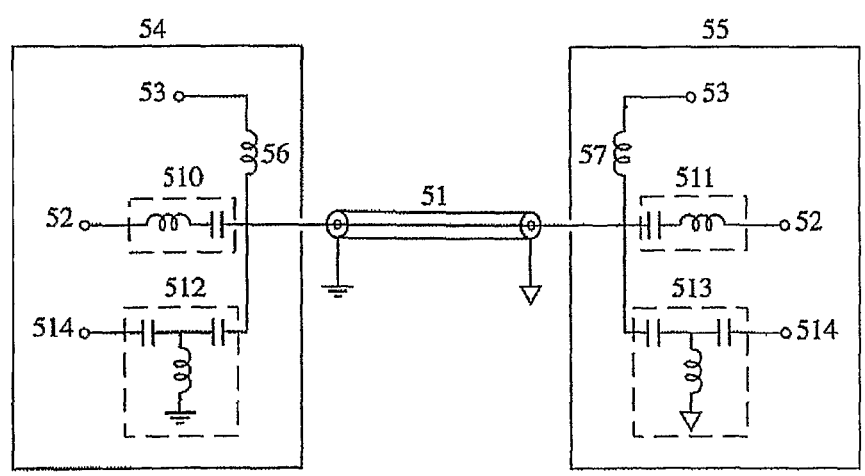

FIG. 5(b) shows more complex frequency selective circuits 54 and 55 where inductors 56 and 57 separate the DC signal 53, band pass circuits 510 and 511 pass the RF signal 52 and high pass and/or band pass circuits 512 and 513 pass control or data RF signals 514.

Figure 6A:
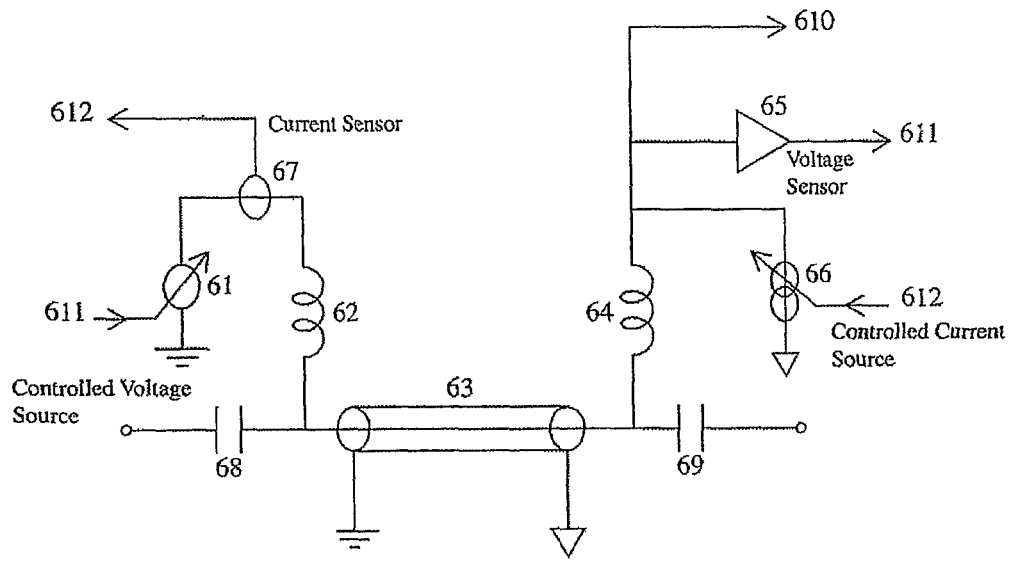
FIGS. 6(a), 6(b) and 6(c) illustrate how the embodiments shown in FIGS. 5(a) and 5(b) can use a single cable for conveying RF signals and bidirectional data using the DC power signal or an RF signal.

FIG. 6(a) illustrates how the arrangement shown in FIG. 5(a) can use a single cable for conveying bidirectional RF signals and bidirectional data using the DC power signal. The RF signals pass through the capacitors 68 and 69 at each end of the cable and are not able to pass through the inductors 62 and 64. The DC voltage and current pass through the inductors 62 and 64 at each end of the cable and are not able to pass through the capacitors 68 and 69. Power is conveyed from voltage source 61 to inductor 62 passes through the cable 63 and inductor 64 at the other end of the cable where it is used to provide electrical power 610. Bidirectional data communication is achieved by using a voltage mode transmission in one direction and a current mode transmission in the reverse direction. The voltage applied by voltage source 61 passes through inductor 62, cable 63 and inductor 64 at the other end of the cable where it is sensed by voltage sensor 65. Data 611 is conveyed from voltage source 61 to voltage sensor 65 by amplitude modulation of the voltage source 61. Current applied by current source 66 injects current through inductor 64, cable 63 and inductor 62 to current sensor 67. Data 612 is conveyed from current source 66 to current sensor 67 by amplitude modulation of the current source 66.

Figure 6B:
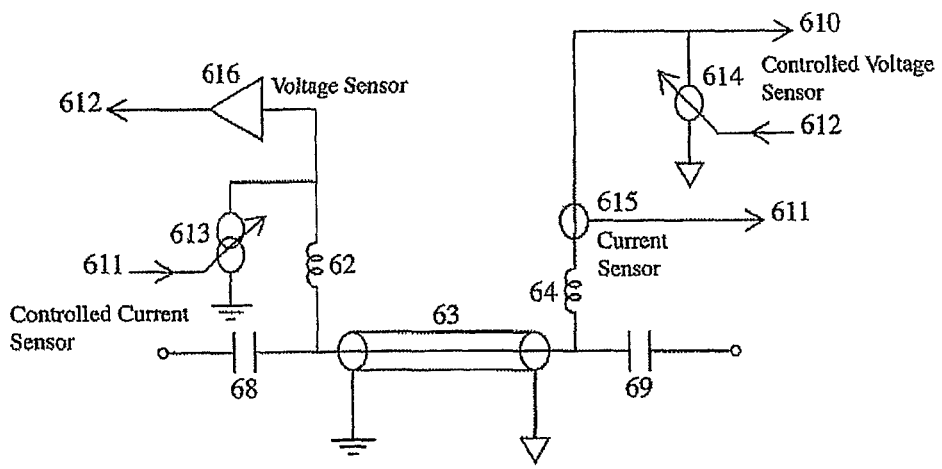
Figure 6C:
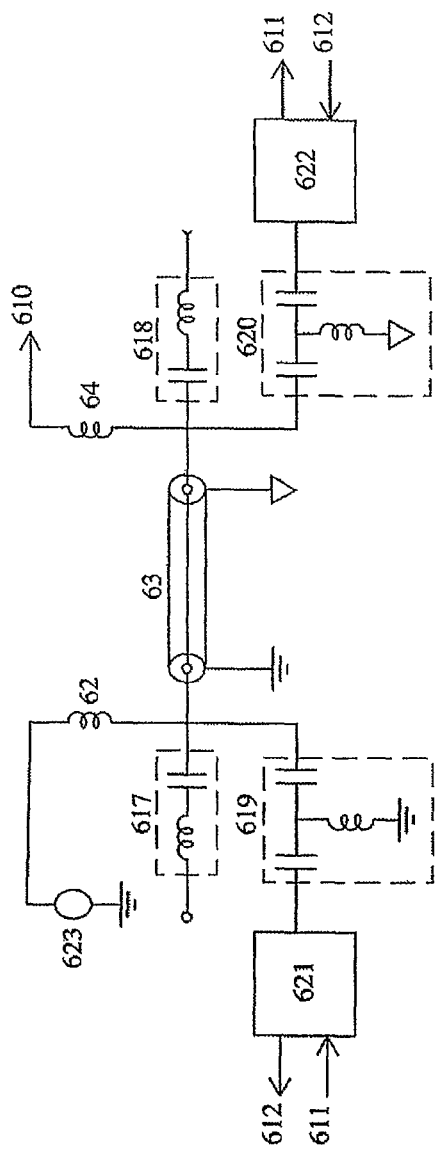

The equivalent dual circuit shown in FIG. 6(*b*) can also be used for bidirectional communication. In the dual circuit voltage source 61 is replaced with a current source 613, current source 66 is replaced with a voltage source 614, voltage sensor 65 is replaced with a current sensor 615 and current sensor 67 is replaced with a voltage sensor 616. Current source 613 injects current through inductor 62, cable 63 and inductor 64 where it is used to provide electrical power 610. Data 611 is conveyed from current source 613 to current sensor 615 by amplitude modulation of the current source 613. Voltage applied by voltage source 614 to inductor 64 passes through inductor 64, cable 63 and inductor 62 to voltage sensor 616. Data 612 is conveyed from voltage source 614 to voltage sensor 616 by amplitude modulation of the voltage source 614. The equivalent dual circuit shown in FIG. 6(*b*) is electrically less efficient than the circuit shown in FIG. 6(*a*). The circuit used in FIG. 6(*a*) is used for the following description of the invention however the invention may equally be applicable to a dual.

FIG. 6(*c*) illustrates how the arrangement of FIG. 5(*b*) can use a single cable for conveying a DC power signal, bidirectional RF signals and bidirectional data using an RF signal. DC power 610 is conveyed from voltage source 623 to inductor 62 passing through the cable 63 and inductor 64 at the other end of the cable where it is used to provide electrical power 610. The RF signal passes through the band pass filters 617 and 618 at each end of the cable. Bidirectional data passes through high pass filters 619 and 620 at each end of the cable. The bidirectional data RF signal is encoded and decoded by RF modems 621 and 622. Depending upon the frequencies used by the bidirectional RF signal and bidirectional data RF signal different combinations of low pass, band pass or high pass filters may be advantageously used for elements 617, 618, 619 and 620 to separate the bidirectional RF signal and bidirectional data signal. RF modems 621 and 622 may advantageously use commercially available cheap short range RF modems, such as the IEEE 802.15.4 'ZigBee™'.

Figure 7:
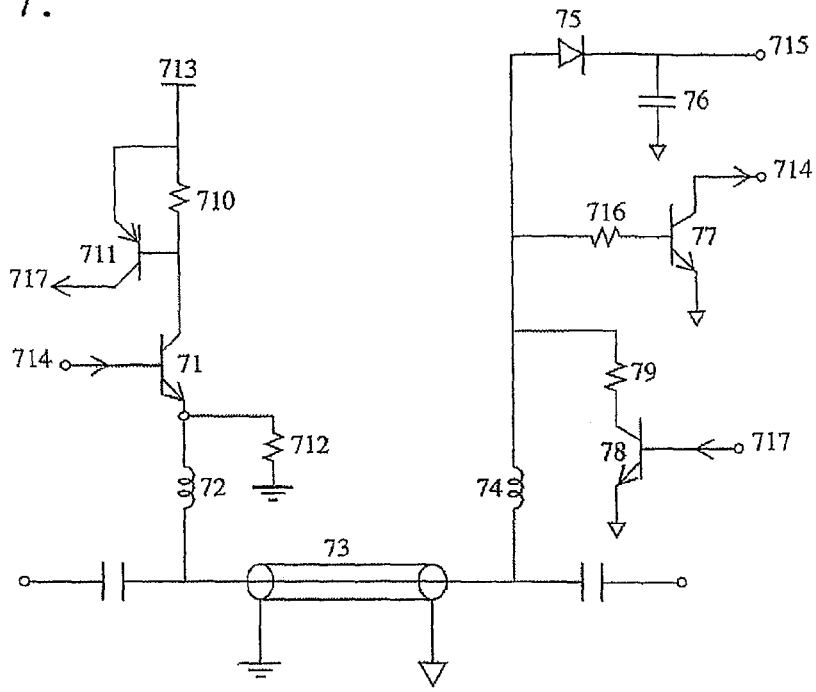
FIG. 7 shows another embodiment of the use of a single cable for conveying RF signals and bidirectional data using a DC power signal.

FIG. 7 shows an example embodiment of the use of a single cable 73 for conveying bidirectional RF signals and bidirectional data 714 and 717 using a DC power signal 713. The circuits required for bidirectional communication are very simple and extremely cheap. The voltage supply 713 is switched by data 714 using pass transistor 71. When the transistor 71 is ON the supply voltage 713 passes through inductor 72, cable 73, inductor 74 and diode 75 to power storage capacitor 76. The voltage 715 on power storage capacitor 76 is used to provide electrical power. When transistor 71 is turned OFF the voltage on inductor 72, cable 73 and inductor 74 discharges to zero volts. A discharge resistor 712 can assist with speeding up the discharge if required. When transistor 71 is turned ON the voltage on the inductor 72, cable 73 and inductor 74 is charged up to its full value. The change in voltage is sensed at the output of inductor 74 by transistor 77. Resistor 716 serves as a base current limiter for transistor 77. The transistor 78 and resistor 79 are a switchable current source controlled by data 717. When the transistor 78 is ON a current equal to the supply voltage 713 divided by the resistor value 79 is drawn through inductor 74, cable 73, inductor 72 and current sense resistor 710. The voltage across current sense resistor 710 is equal to the current multiplied by the sense resistor value. The change in current through the sense resistor is detected by transistor 711.

Figure 8:
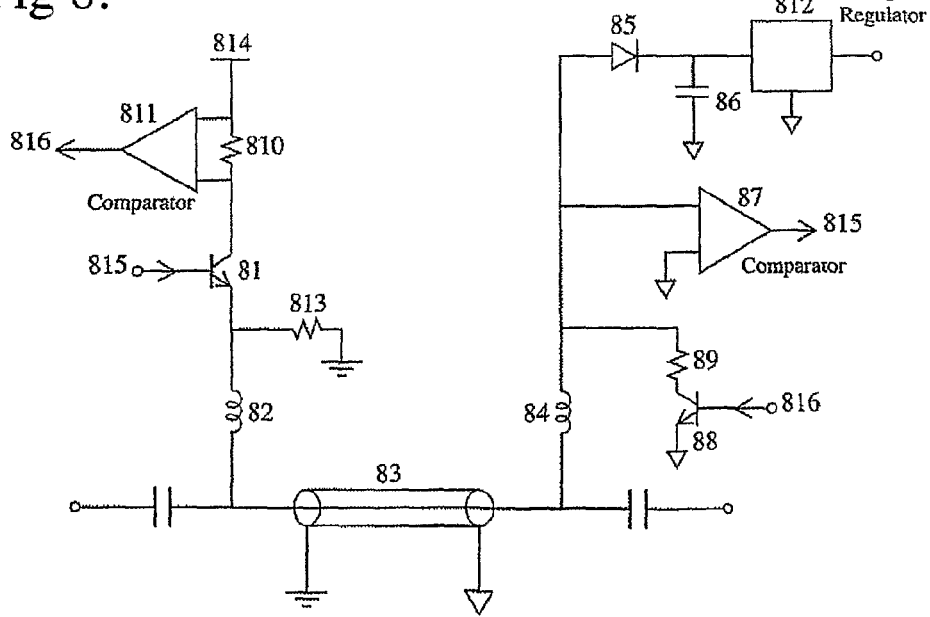
FIG. 8 shows yet another embodiment of the use of a single cable for conveying RF signals and bidirectional data using a DC power signal.

FIG. 8 shows yet another embodiment of the use of a single cable 83 for conveying bidirectional RF signals and bidirectional data 815 and 816 using a DC power signal 814. The voltage supply 814 is switched by data 815 using pass transistor 81. When the transistor 81 is ON the supply voltage passes through inductor 82, cable 83, inductor 84 and diode 85 to power storage capacitor 86. The voltage on power storage capacitor 86 is regulated to a fixed DC voltage by regulator 812 and is used to provide electrical power. When transistor 81 is turned OFF the voltage on inductor 82, cable 83 and inductor 84 discharges to zero volts. A discharge resistor 813 can assist with speeding up the discharge if required. When transistor 81 is turned ON the voltage on the inductor 82, cable 83 and inductor 84 is charged up to it full value. The change in voltage is sensed at the output of inductor 84 by comparator 87. The transistor 88 and resistor 89 are a switchable current source controlled by data 816. When the transistor 88 is ON a current equal to the supply voltage 814 divided by the resistor value 89 is drawn through inductor 84, cable 83, inductor 82 and current sense resistor 810. The voltage across current sense resistor 810 is equal to the current multiplied by the sense resistor value. The change in current through the sense resistor is sensed by comparator 811.

Figure 9A:
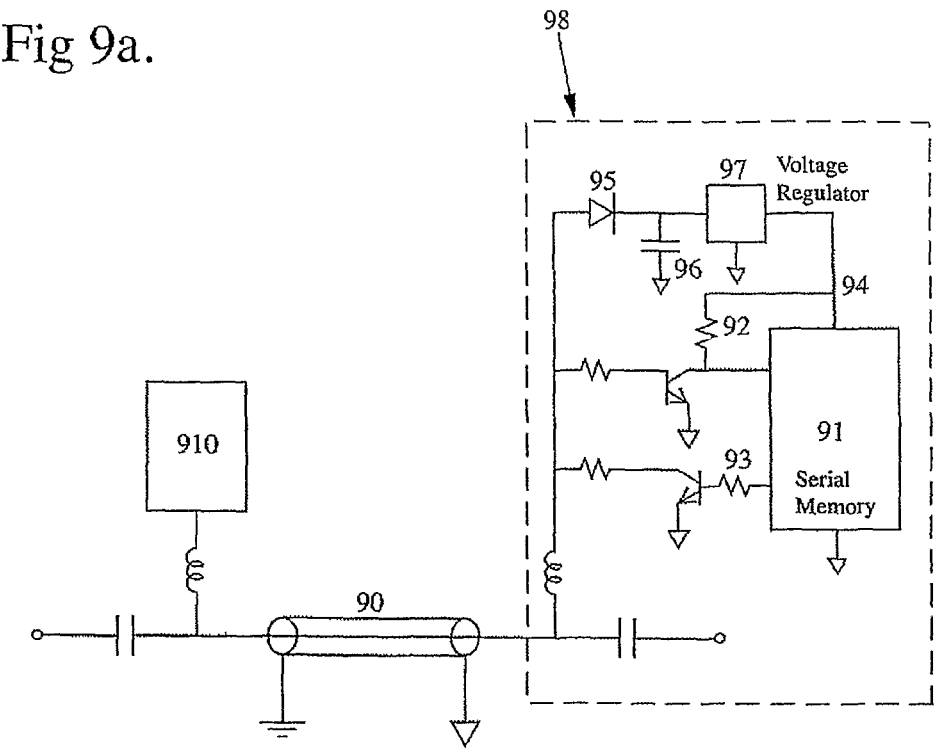
FIGS. 9(a), 9(b) and 9(c) show yet other embodiments of the use of a single cable for conveying RF signals and data using a DC power signal.
Figure 9B:
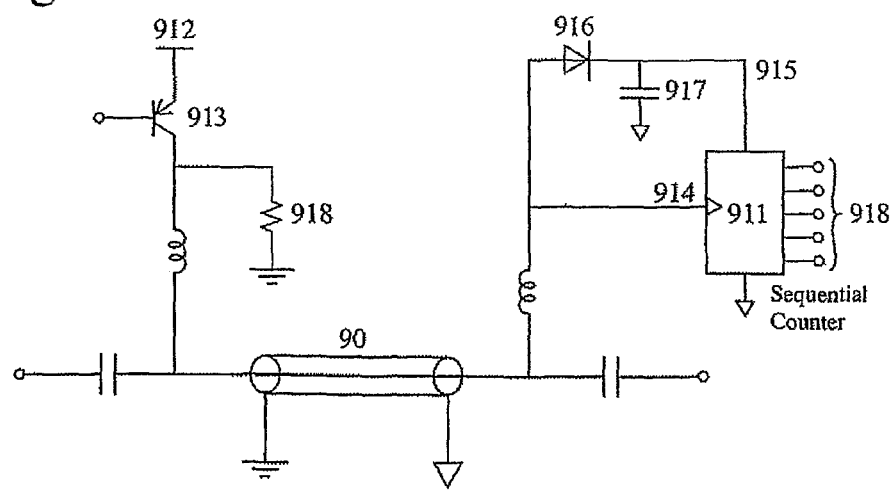
Figure 9C:
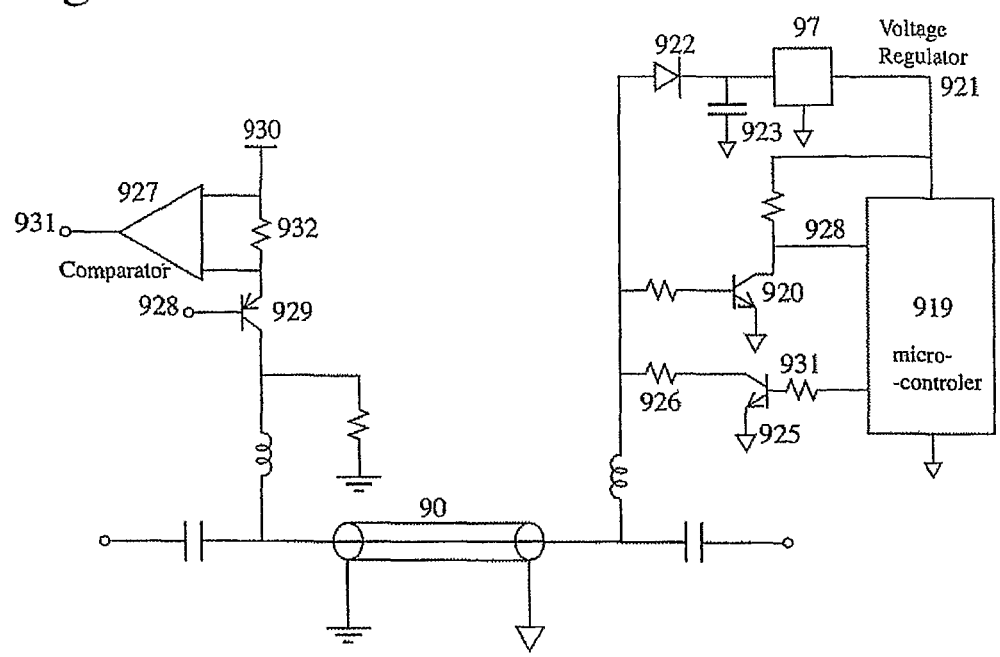

FIGS. 9(*a*), 9(*b*) and 9(*c*) shows yet other embodiments of the use of a single cable 90 for conveying bidirectional RF signals and bidirectional data using a DC power signal.

FIG. 9(*a*) shows a two wire memory chip 91 connected to the circuit. A two wire memory chip uses two wires for reading and writing data. One wire 92 is for input data and the other wire 93 is for output data. Data is passed serially. The supply voltage 94 to the memory is maintained by the action of diode 95, power storage capacitor 96 and voltage regulator 97. The memory chip can be programmed with uniquely identifying data so that it can signal its identity and/or 'type' of device down the cable to the circuits/reader 910 at the other end of the cable. This is very useful where a new circuit 98 is connected to the cable 90 and allows the circuit 98 to identify itself, automatically or on demand, to the circuits 910 at the other end of the cable. The installation of new circuits 98 to the cable would then allow for automatic configuration and true 'plug and play' of these circuits without the need for manual configuration of the system.

FIG. 9(*b*) shows a logic circuit 911 connected to the circuit. The logic circuit is a counter circuit which is clocked each time the DC power signal 912 is pulsed low. When transistor 913 is turned OFF the power supply voltage 912 supplied to the cable is disconnected and the voltage on the cable and at the counter circuit clock input 914 of the counter circuit discharges. A discharge resistor 918 can assist with speeding up the discharge if required. The supply voltage 915 to the counter circuit 911 is maintained by the action of diode 916 and power storage capacitor 917. When transistor 913 is turned ON the clocking input is pulled high and the counter circuit will increment its count value. The counter circuit is configured to sequentially activate only one output line 918 at any time. The circuit shown in FIG. 9(*b*) can be used to sequentially active other circuits connected to the counter circuit 911. An example of a suitable counter circuit is the CD 4017 decade counter. The count length is set by connecting the chip reset to the appropriate decode output.

FIG. 9(*c*) shows a micro-controller 919 connected to the circuit. Data 928 controls switching transistor 929 which controls the application of the DC supply voltage 930. The transistor 920 is used to clock data 928 into the micro-controller. The supply voltage 921 to the micro-controller is maintained by the action of diode 922, power storage capacitor 923 and voltage regulator 924. The microcontroller can be used to control other circuits such as tuning control circuits, memory circuits, displays, lights and sounds for example.

The micro-controller can also monitor circuit function and signal this functional information and any other reply data 931 back using the switched current source made from transistor 925 and resistor 926. The reply data 913 is sensed by current sense resistor 932 and comparator 927. The reply data 913 can include a pre-programmed identifier, pre-programmed data, circuit parameters such as voltage, current, phase, temperature or frequency and tuning parameters for example.

Figure 10A:
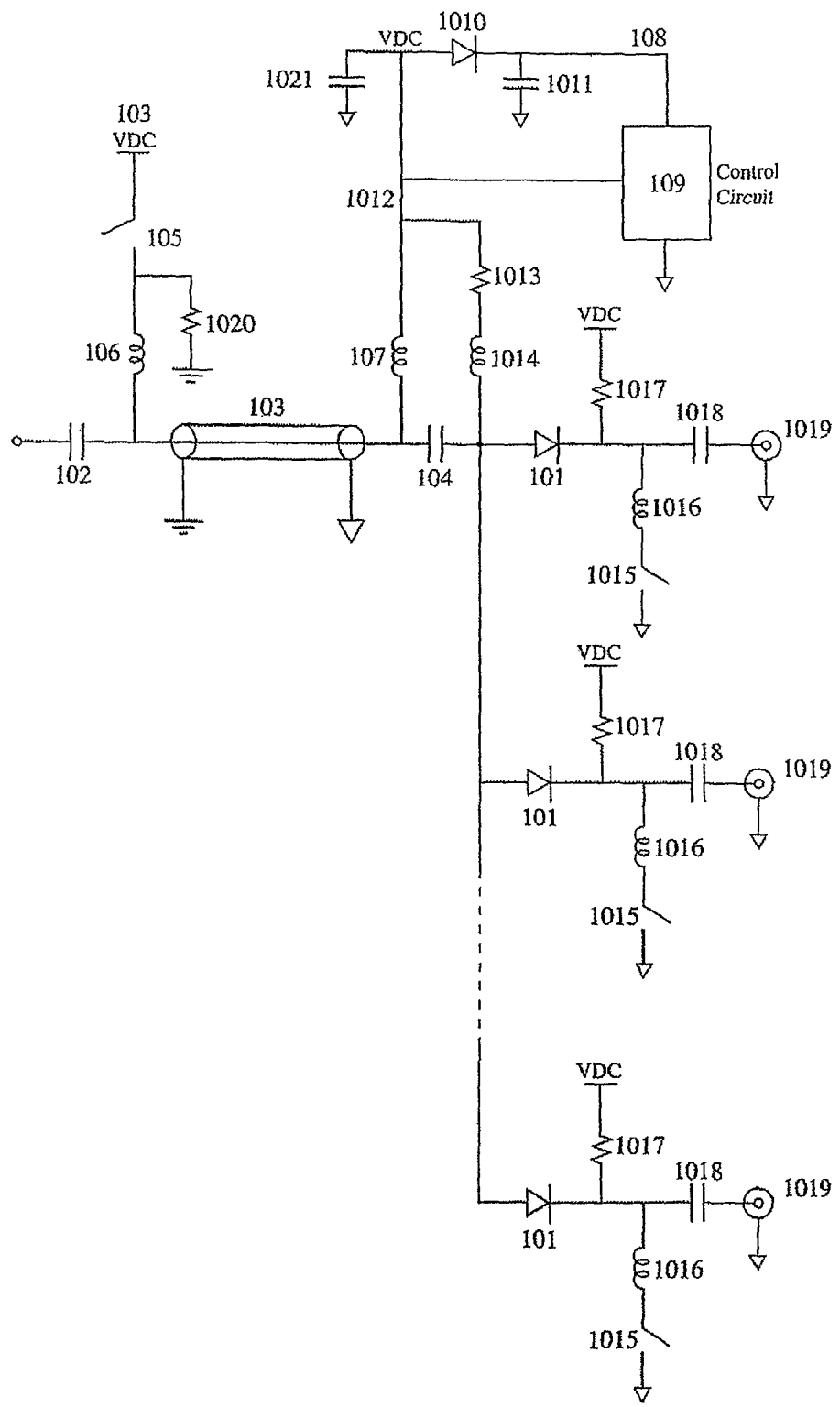
FIGS. 10(a) and 10(b) show embodiments of an RF MUX circuit using a single cable for conveying RF signals and data using a DC power signal.

FIG. 10(a) shows an RF MUX circuit using a single cable 103 for conveying RF signals and data using a DC power signal 103. The RF MUX uses PIN diodes 101 to switch the RF signal passed through capacitor 102, cable 103 and capacitor 104. The DC supply voltage 103 passes through switch 105, inductor 106, cable 103, inductor 107 and supplies electrical power 108 to control circuit 109. Diode 1010 and power storage capacitor 1011 isolate the control circuit supply voltage 108 from pulses on the signalling voltage 1012 caused by switch 105. The PIN diodes 101 are forward biased through current limiting resistor 1013 and inductor 1014. The PIN diodes 101 are forward biased by closing their respective pull down switch 1015. Inductor 1016 passes DC current and isolates the switch 1015 from the RF signal. Typically only one PIN diode is turned on at anytime. The remaining PIN diodes 101 are reverse biased through pull up resistor 1017. Output capacitor 1018 passes the RF signal to the output port 1019 and isolates the DC voltage at the PIN diode cathode from the output port. The control circuit 109 controls the pull down switches 1015 and sequentially switches the diode switches. Signalling pulses from switch 105 transmit data to the control circuit and may direct its operation. A discharge resistor 1020 can assist with speeding up the discharge of the signalling voltage 1012 and a decoupling capacitor 1021 can reduce the RF voltage coupled through inductor 107.

In all of the circuit embodiments shown the supply voltage isolated by the diode and DC storage capacitor can be post regulated to a lower value by a voltage regulator circuit or boosted to a higher value by a voltage boost circuit. A lower voltage may be required by low voltage logic or microcontroller circuits for example and a higher voltage may be required by PIN diode switches for higher reverse biases. It is also possible that regulator or voltage boost circuits could be directly connected without the isolation diode and DC storage capacitor.

Figure 10B:
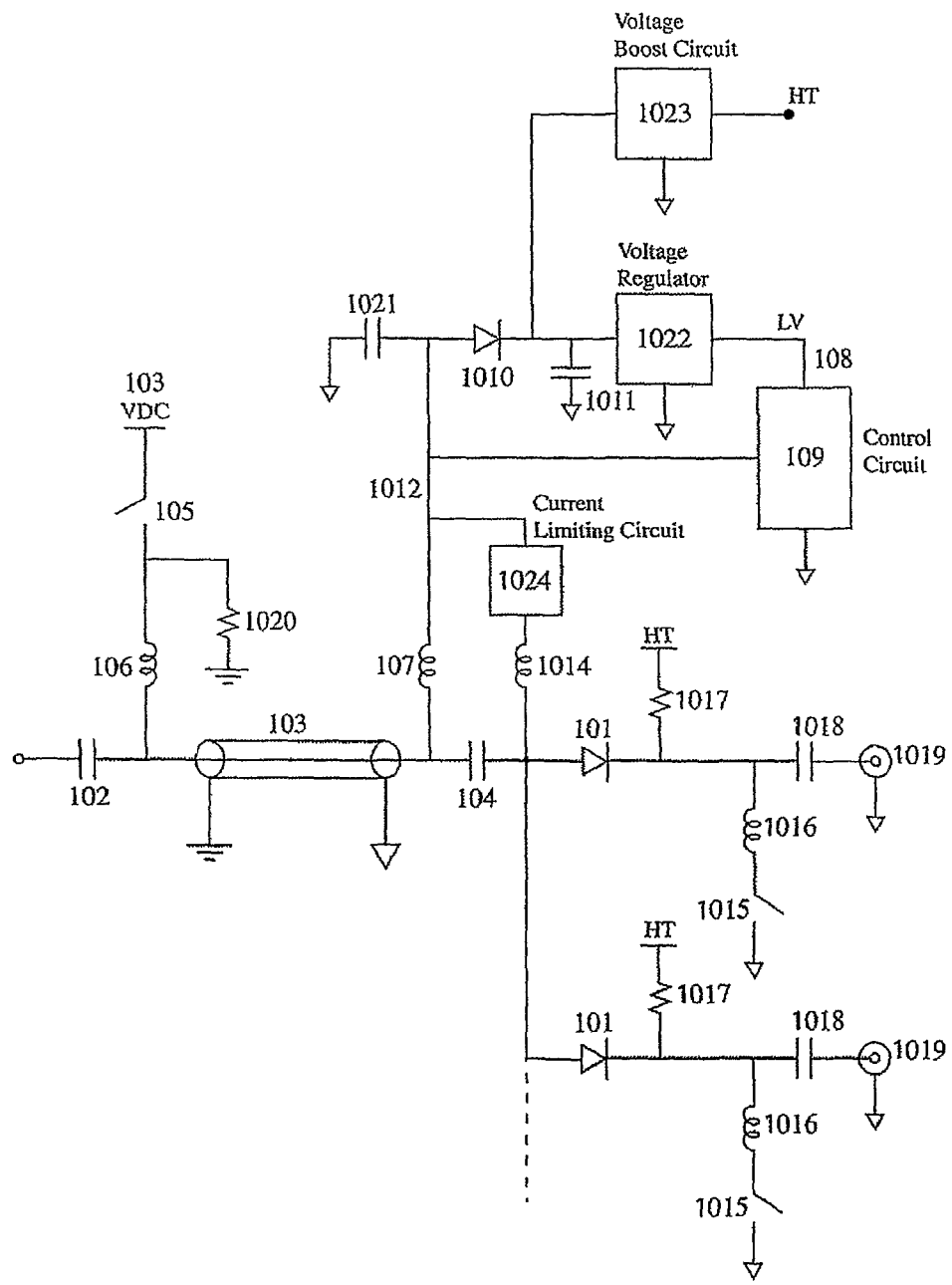

FIG. 10(b) shows the RF MUX circuit of FIG. 10(a) where, the supply voltage is post regulated to a lower value LV by a voltage regulator 1022 for logic or microcontroller circuits and boosted to a higher value HT by a voltage boost circuit 1023 to provide a higher reverse bias for the PIN diode switches. Current limiting resistor 1013 has been replaced by a current limiting circuit 1024 which could be a linear or switching current limiting circuit.

While the embodiments show PIN diodes being used for RF switches other form of RF switches can be used such as relays or micro electro-mechanical switches (MEMS).

Figure 11:
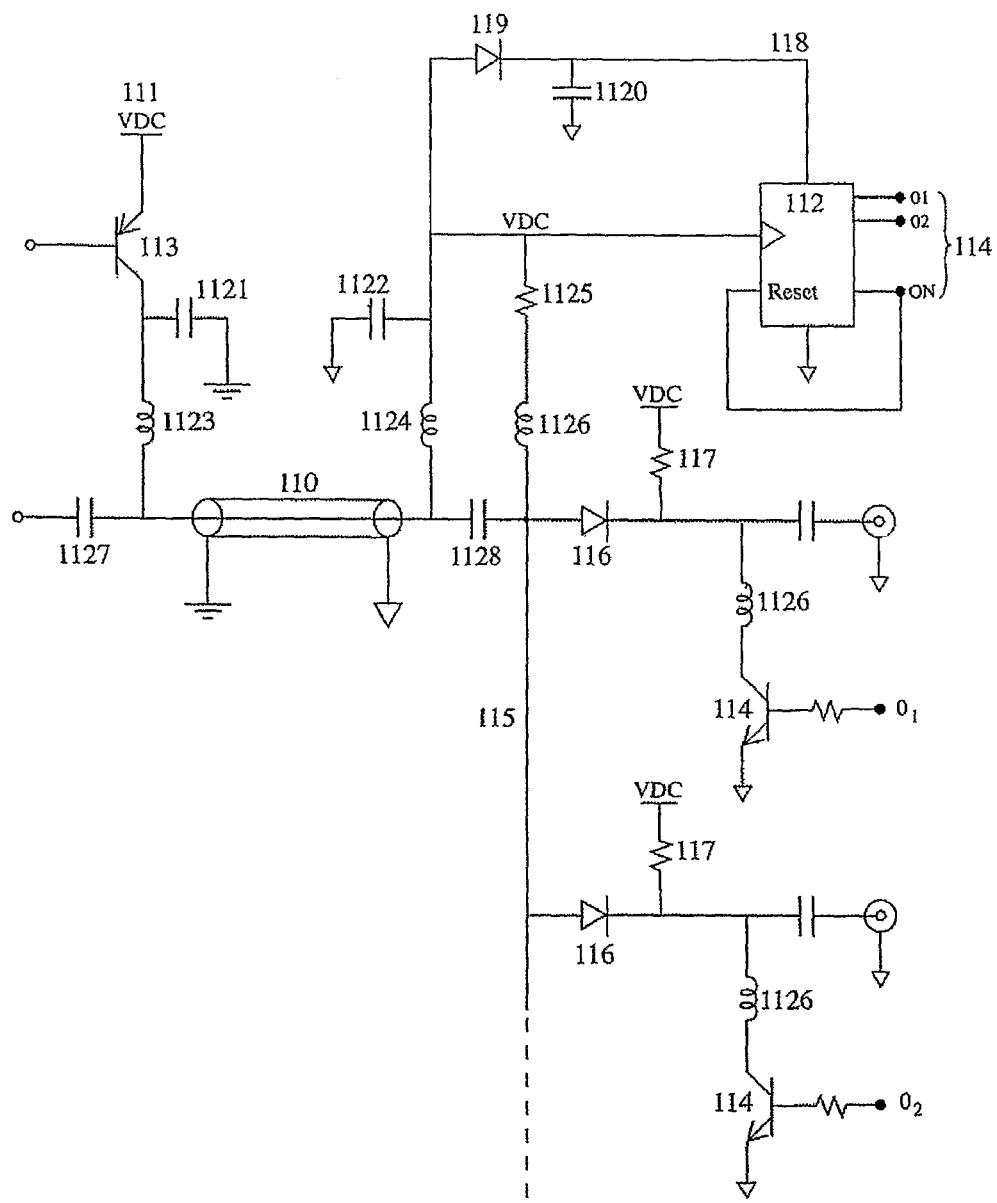
FIG. 11 shows another embodiment of an RF MUX circuit using a single cable for conveying RF signals and data using a DC power signal.

FIG. 11 shows another embodiment of an RF MUX circuit using a single cable 110 for conveying bidirectional RF signals and data using a DC power signal 111. A counter circuit 112 is clocked by pulses on the signalling voltage caused by transistor 113. An example of a suitable counter circuit is the CD 4017 decade counter where the count length is set by connecting the chip reset to the appropriate decode output. The counter supply voltage 118 is isolated from the signalling pulses by diode 119 and DC storage capacitor 1120. The counter outputs 114 are clocked sequentially. Only one output of the counter is active at any one time. The outputs of the counter 112 are connected to pull down transistors 114. The voltage at the PIN diode 116 common node 115 approximately equals 1.0V being the PIN diode 116 forward voltage drop (0.8V) plus the pull down transistor 114 saturation voltage (0.2V). All PIN diodes are reverse biased by their respective pull up resistors 117. The PIN diode reverse voltage is the DC supply voltage 111 less 1.0V. Decoupling capacitors 1121 and 1122 reduce the RF signal coupled through inductors 1123 and 1124. PIN diode 116 forward bias current is limited by current limiting resistor 1125. Inductor 1126 passes the DC bias current and isolates the circuit from the RF signal. The RF signals pass through the capacitors 1127 and 1128 at each end of the cable and are not able to pass through the inductors 1123, 1124 and 1126.

Figure 12:
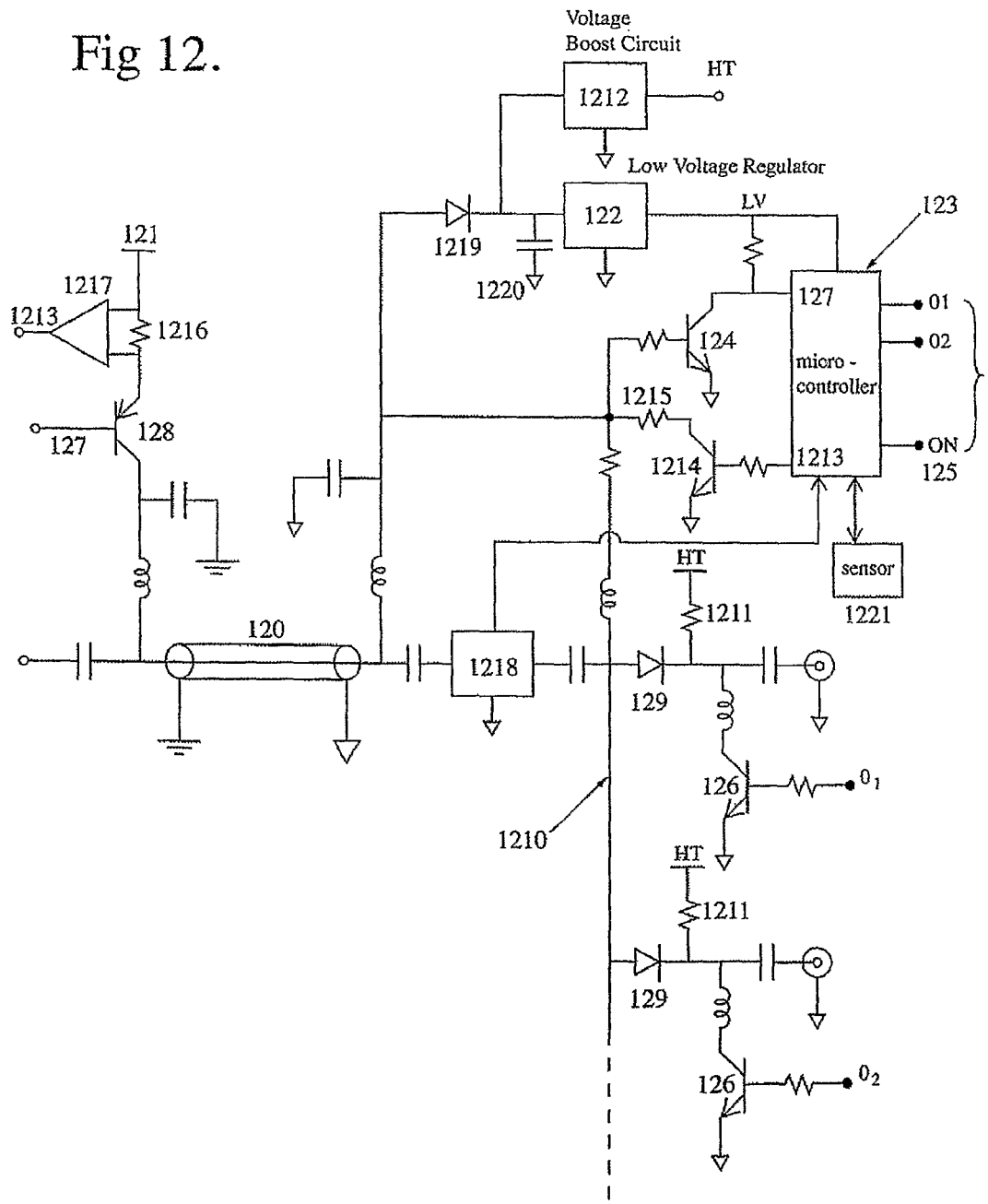
FIG. 12 shows yet another embodiment of an RF MUX circuit using a single cable for conveying RF signals and bidirectional data using a DC power signal.

FIG. 12 shows yet another embodiment of an RF MUX circuit using a single cable 120 for conveying RF signals and bidirectional data using a DC power signal 121. The DC power signal may be regulated to a lower voltage more suitable for a microcontroller by regulator 122. The microcontroller 123 received data 127 from transistor 124. The outputs of the microcontroller 125 are connected to pull down transistors 126. The microcontroller controls its outputs under direction of data 127 sent as pulses of the power signal caused by switching transistor 128. In one embodiment the microcontroller counts sequentially through its outputs. The voltage at the PIN diode 129 common node 1210 approximately equals 1.0V being the PIN diode 129 forward voltage drop (0.8V) plus the pull down transistor 126 saturation voltage (0.2V). All PIN diodes are reverse biased by their respective pull up resistors 1211. The PIN diode reverse voltage is the DC supply voltage less 1.0V. If the reverse bias is not sufficiently large then a voltage boost circuit 1212 can be included to increase the PIN diode reverse bias voltage HT. The microcontroller is also able to send reply data 1213 by the switchable current source transistor 1214 and resistor 1215. When the transistor 1214 is ON a current equal to the supply voltage 121 divided by the resistor value 1215 is drawn. The change in current is sensed at the other end of the cable by current sense resistor 1216 and comparator 1217. The reply data 1213 can include an identification number, pre-programmed data or circuit parametric values such as voltage, current, phase, temperature or tuning state. For example a tuning detector circuit 1218 which provides a voltage proportional to the phase relationship between the RF signal voltage and current could be monitored by the microcontroller and the tuning state information returned as part of the reply data 1213. Diode 1219 and DC storage capacitor 1220 isolate the LV and HT circuits from the power signalling pulses. Other sensors 1221 can also be monitored by the microcontroller and their state returned as part of the reply data 1213. Temperature, current or voltage are examples of parameters that could be monitored.

Figure 13:
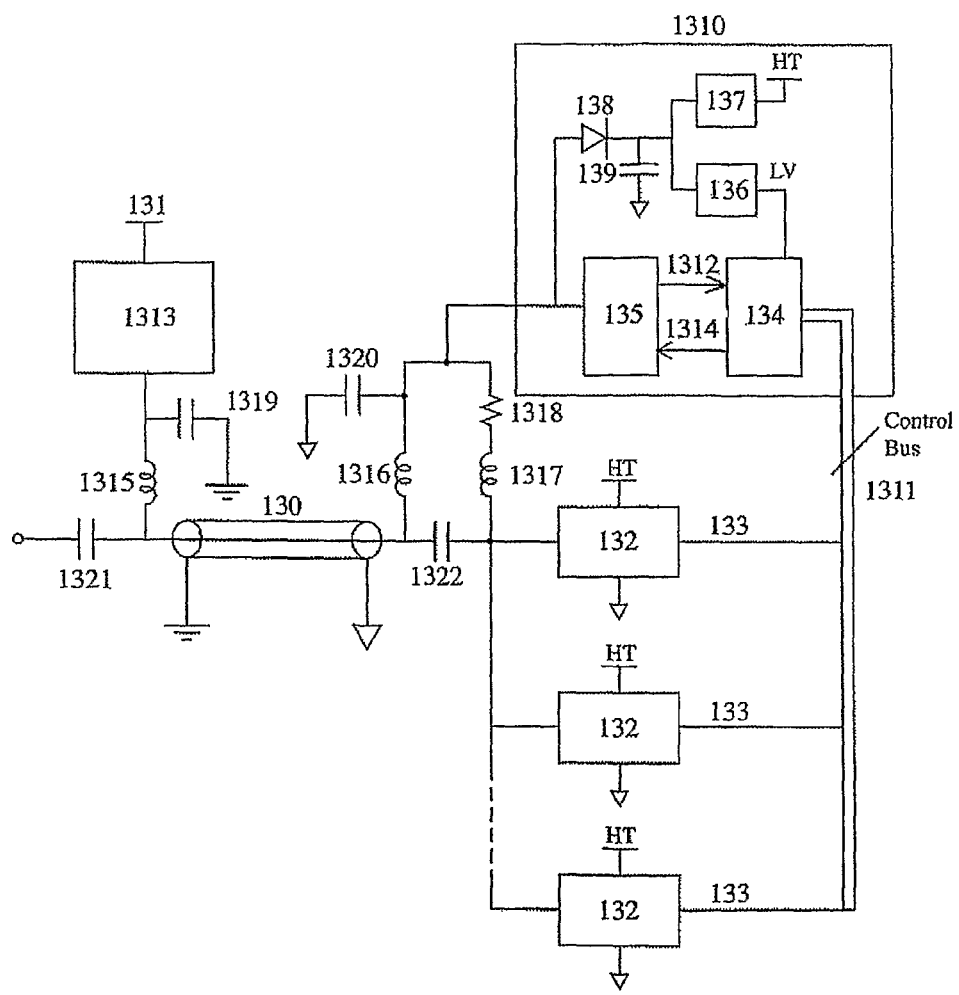
FIG. 13 shows yet another embodiment of an RF MUX circuit using a single cable for conveying RF signals and bidirectional data using a DC power signal, where antennas are an integral part of the MUX circuits.

FIG. 13 shows an embodiment of an RF MUX which uses a single cable 130 for conveying RF signals and bidirectional data using a DC power signal 131 where switchable antennas 132 are an integral part of the MUX circuits. The MUX output ports have been replaced by switchable antennas 132. Each antenna includes integral RF switches which are controllable by control ports 133. The logic or control circuits 134, data transmit and receive circuits 135, power supply voltage regulator 136 for the LV supply, voltage boost circuit 137 for the reverse bias HT supply and the isolating diode 138 and DC storage capacitor 139 are contained in the circuit block 1310. Individual control lines of the control bus 1311 from the logic or control circuits 134 control the switchable antennas 132 to be in an active or not active state. The antennas 132 can be individually switched by the logic or control circuits 134. The reverse bias HT is supplied to the switchable antennas 132 for biasing integral PIN diode switches. Other RF switches such as relays or MEMs can be used instead of PIN diodes. The antennas 132 are switched in a sequential fashion by the control circuit 134 under direction of data 1312 sent from the circuits 1313 at the other end of the cable 130. The data 1312 is received by the data receive circuits 135. The control circuits 134 can transmit reply data 1314 to the circuits 1313 at the other end of the cable using the data transmit circuits 135. Inductors 1315, 1316 and 1317 pass DC currents and isolate the circuit from the RF signal. RF switch forward bias current is limited by current limiting resistor 1318. Decoupling capacitors 1319 and 1320 reduce the RE signal coupled through inductors 1315 and 1316. The RF signals pass through the capacitors 1321 and 1322 at each end of the cable and are not able to pass through the inductors 1315, 1316 and 1317.

Figure 14:
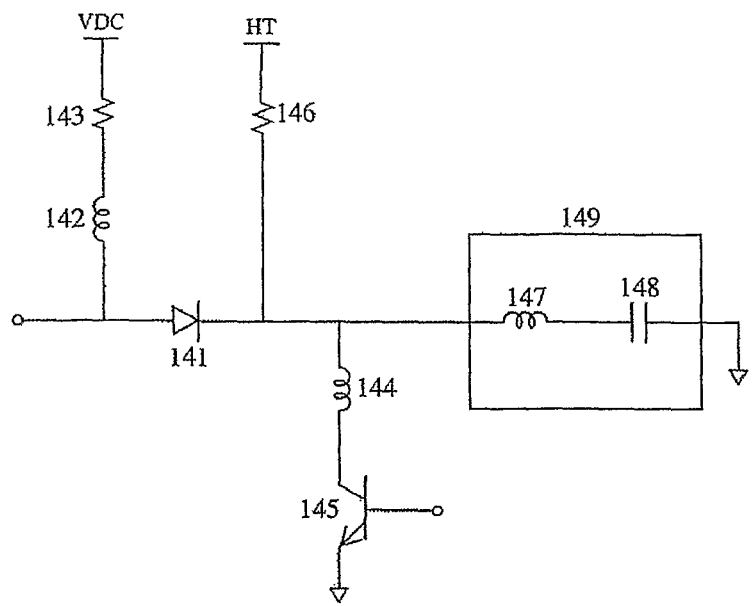
FIG. 14 shows an example circuit of an antenna incorporating an RF switch.

FIG. 14 shows an example circuit of an antenna incorporating an RF switch. A PIN diode RF switch 141 is forward biased by inductors 142, current limit resistor 143, pull down transistor 145 and inductor 144. The diode is reverse biased by pull up resistor 146 when transistor 143 is OFF. The inductor 147 and capacitor 148 form a tuned antenna 149 that is connected to the PIN diode switch 141.

Figure 15:
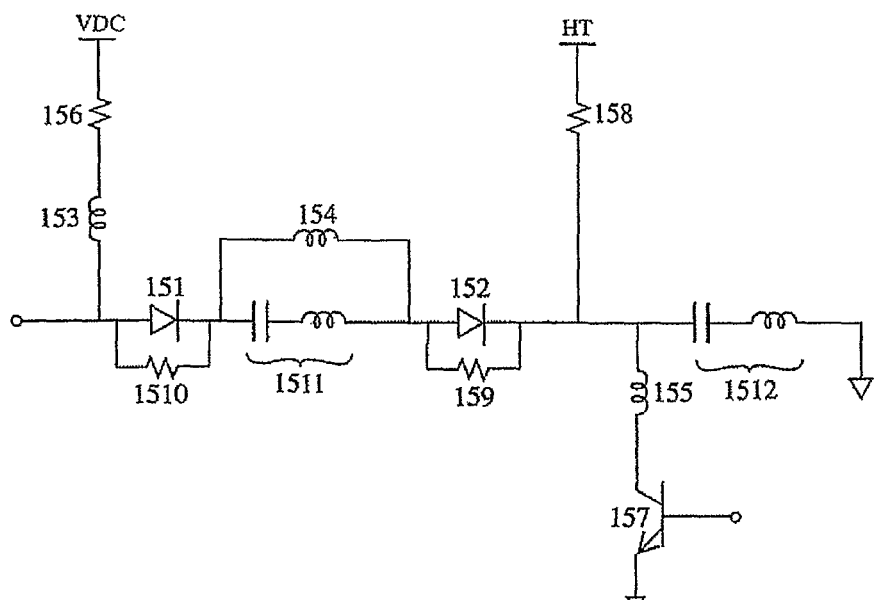
FIG. 15 shows an example circuit for an antenna incorporating several RF switches.

FIG. 15 shows an example circuit for an antenna incorporating several RF switches. PIN diode RF switches 151 and 152 are forward biased by inductors 153, 154 and 155, current limit resistor 156 and pull down transistor 157. The diodes are reverse biased by pull up resistor 158 and voltage balancing resistors 159 and 1510 when transistor 157 is OFF. The tuned antenna consists of tuned circuit elements 1511 and 1512.

Figure 16A:
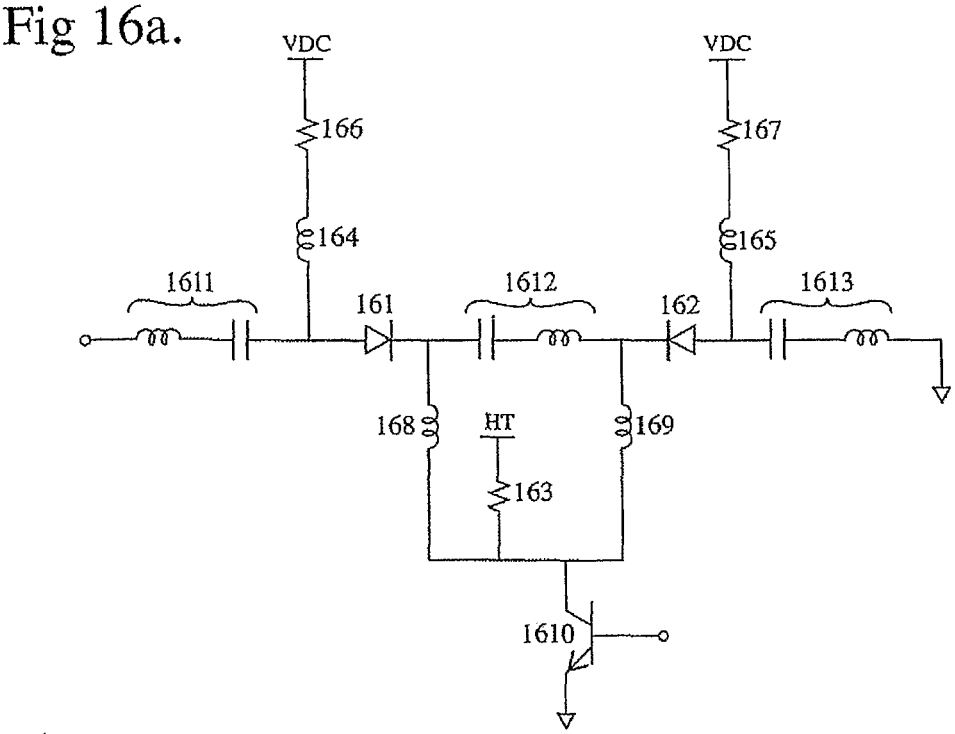
FIGS. 16(a) and 16(b) show example circuits of antennas incorporating several RF switches.
Figure 16B:
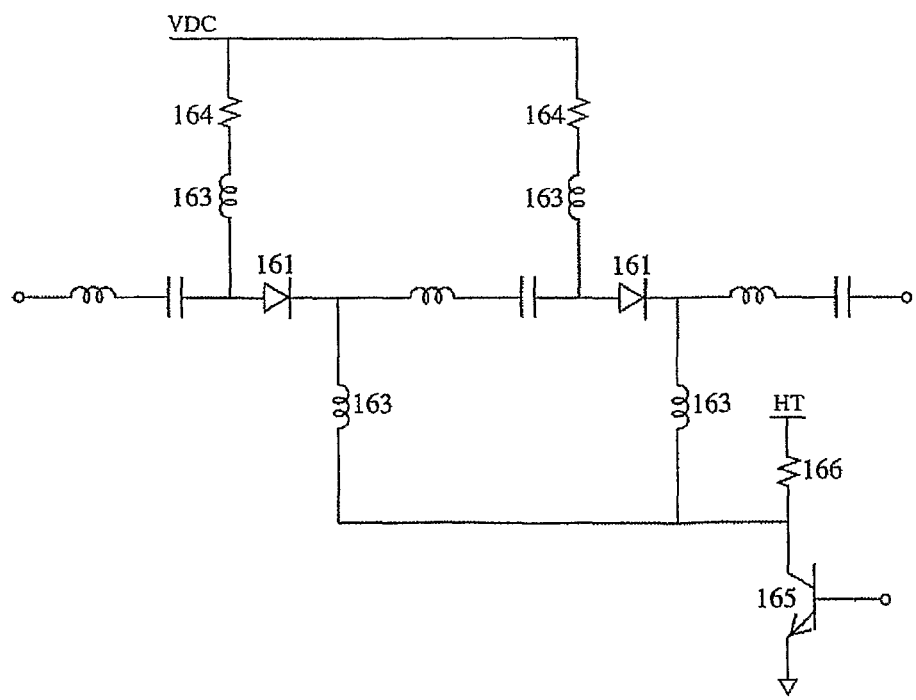

FIG. 16(*a*) shows yet another example circuit of an antenna incorporating several RF switches. The circuit shown in FIG. 16 has double the reverse bias across each PIN diode switch 161 and 162 by applying the reverse bias at the centre of the antenna through pull up resistor 163. In this way the reverse bias is divided between fewer series connected diodes The PIN diodes forward bias current is input from both ends of the antenna through inductors 164 and 165, current limiting or balancing resistors 166 and 167, inductors 168 and 169 and pull down transistor 1610. The tuned antenna consists of tuned circuit elements 1611, 1612 and 1613.

FIG. 16(*b*) shows yet another example of an antenna incorporating several RF switches 161. Each PIN diode switch is individually connected to the reverse bias through isolating inductors 163 and resistor 164. When transistor 165 is OFF the reverse bias voltage is applied across each diode by pull up resistor 166. When transistor 165 is ON the diodes are forward biased. Current limiting or balancing resistors 166 ensure that each diode draws an equal current.

As would be appreciated by those skilled in the art, combinations of the biasing methods shown and numbers of diodes can be used depending upon the characteristics of the antenna. If there is a high inductive coupling from adjacent or overlapping antennas then a higher reverse bias voltages per PIN diode will be required to counteract the induced voltage. If there is a high stray capacitance between adjacent or overlapping antenna coils then more PIN diodes will be required to open the coils in more places. The shorter the open coil lengths are the lower the stray capacitance of each length becomes.

It would also be understood that various of the embodiments disclosed herein are possible by variations to and/or various combinations of the embodiments, as might be required.

Figure 17A:
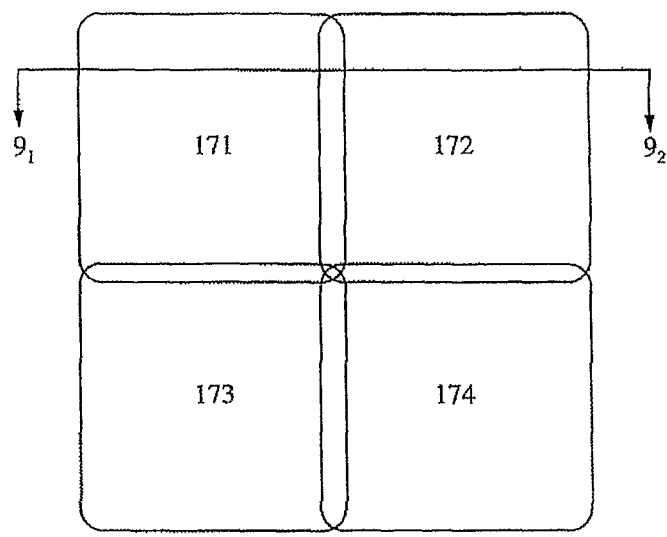
FIGS. 17(a) and 17(b) show antenna arrays suitable for generating a sequentially switched interrogation field in at least one dimension.
Figure 17A:
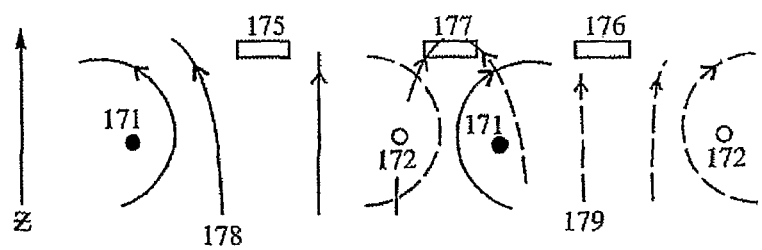

FIGS. 17(*a*), 17(*b*), 18(*a*), 18(*b*), 19(*a*), 19(*b*) and 19(*c*) show various antenna arrays. For clarity purposes each antenna is shown as only one turn where as they may consist of multiple turns. Multiple turn coils have the advantages of producing a stronger field and receiving a stronger transponder reply signal as the conductors are connected in series. The conductors are suitably interconnected, but the connections are not shown as any suitable manner of coupling to a source of power and/or communications can be implemented.

The conductors and/or the antennas may be placed in an overlapping position with respect to each other. The amount of the overlap may be anywhere between greater than 0% and less than 100%.

FIG. 17(*a*) shows an array of antennas 171, 172, 173, 174 suitable for generating a sequentially switched interrogation field in at least one dimension. The antennas are arranged to overlap sufficiently to ensure reliable field strengths in the Z direction where the Z direction is normal to the plane of the antennas. The cross sectional view through $a_1$-$a_2$ shows the magnetic field directions 178 and 179 for the two antennas 171 and 172 respectively. A tag oriented to be powered in the Z direction is shown in positions 175 and 176 near the centre of the antennas 171 and 172 and in position 177 in the overlapping region. There is a reliable field strength in the Z direction for all three positions 175, 176 and 177, The overlap ensures that there is a reliable field in the Z direction regardless of the tag position above (or below) the antenna array.

The antenna array of FIG. 17(*a*) is sequentially switched in order to generate the interrogation field in at least one dimension. Due to the antennas close proximity there will be high levels of inductive and capacitive parasitic coupling. Capacitive parasitic coupling results in parasitic currents flowing through the stray capacitance from the active antenna into the not active antennas. Inductive parasitic coupling causes voltages to be induced in the not active antennas and these voltages result in parasitic currents flowing in the not active antennas. The parasitic currents and voltages increase the losses of the active antenna, may detune the active antenna, may generate harmonics in circuits connected to the not active antennas and may distort the field direction. These parasitic coupling effects are undesirable. If each antenna incorporates individually or a combination of RF switches as shown in FIGS. 14, 15, 16(*a*) and 16(*b*) then the antennas array can be sequentially switched and the effects of the parasitic mutual coupling between the antennas (both capacitive and inductive) can be eliminated or minimised.

The antenna array of FIG. 17(*a*) has 4 antennas 171, 172, 173, 174 and would require 4 connecting cables to a reader. If the number of antennas in the array is increased to increase the size of the array then an additional connecting cable will be required for each additional antenna. The ever enlarging bundle of cables represents an additional cost and an installation difficulty.

FIGS. 10(*a*), 10(*b*), 11, 12 and 13 show example circuits suitable for RF switch control which are controlled using a single cable for conveying bidirectional RF signals and bidirectional data using a DC power signal. By incorporating RF, switches directly into the antennas of the antenna array shown in FIG. 17(*a*) and controlling the antenna array with a single cable for conveying bidirectional RF signals and bidirectional data using a DC power signal, the bundle of connecting cables can be replaced with a single cable.

FIG. 17(*b*) shows an antenna array suitable for generating a sequentially switched interrogation field in at least one dimension where an RF switch control circuit 1714 as shown for example in FIGS. 10(*a*), 10(*b*), 11, 12 and 13 has been included. The switch control circuit 1714 is controlled using a single cable 1715 for conveying bidirectional RF signals and bidirectional data using a DC power signal and each antenna 1710, 1711, 1712, 1713 incorporates individually or a combination of RF switches as shown for example in FIGS. 14, 16, 16(a) and 16(b). The antenna array has the same antenna pattern as shown in FIG. 17(a) to ensure reliable field strengths in the Z direction where the Z direction is normal to the plane of the antennas. Only one cable is required to connect to the antenna array which greatly reduces the cost and complexity of installation. Furthermore each port of a multi-port reader can now control one array where each array can consist of many antenna elements greatly increasing the number of antennas connected to a single reader and reducing the total number of readers required in an installation.

Figure 17B:
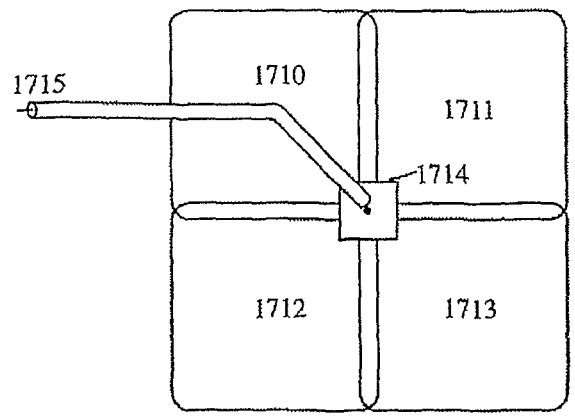

The antennas of the sequentially switched antenna array of FIG. 17(b) are significantly smaller than the overall size of the array. The emission of radiation from an electrically small loop is proportional to the magnetic moment of the antenna coil. An electrically small loop is a loop with dimensions less than 1/10 of the operating frequency free space wavelength and the magnetic moment of a coil is the product of coil area times the number of turns and the coil current. By using many small antennas with a cumulative area equal to the total array area to replace one large antenna equal to the array area the emission of radiation is significantly reduced.

Figure 18A:
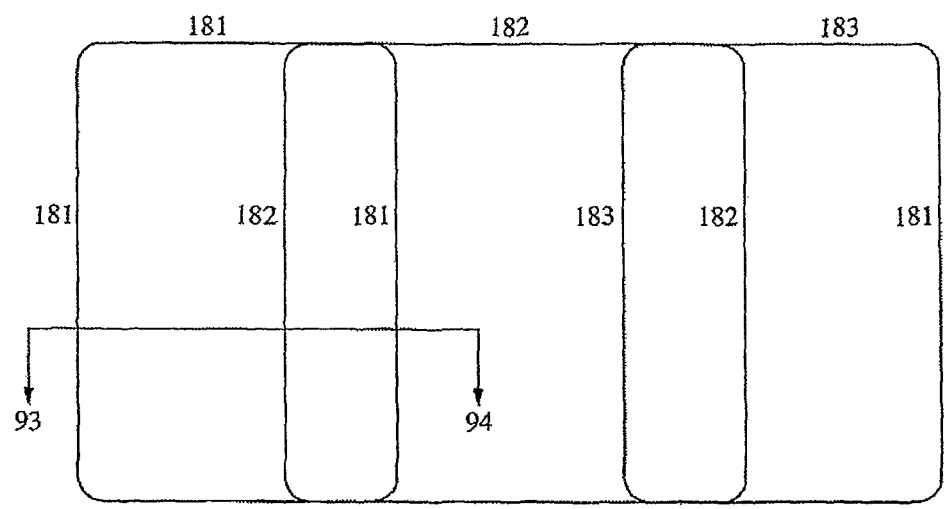
FIGS. 18(a) and 18(b) show antenna arrays suitable for generating a sequentially switched interrogation field in at least two dimensions.
Figure 18A:
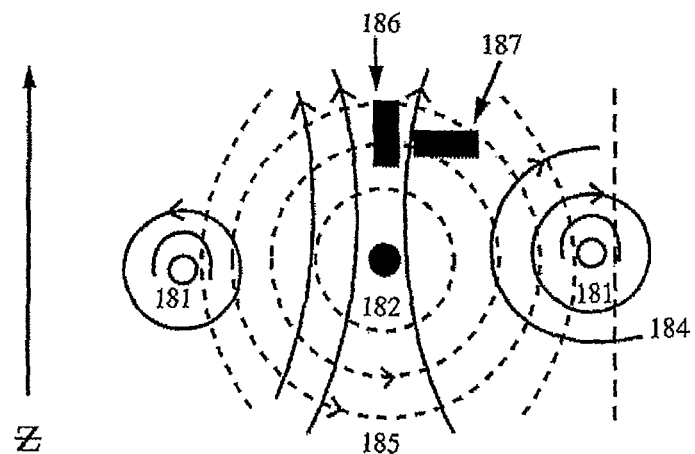

FIG. 18(a) shows an array of antennas 181, 182, 183 suitable for generating a sequentially switched interrogation field in at least two dimensions. The antennas are arranged to overlap sufficiently to ensure reliable field strengths in the X and Z directions where the X direction is in the plane of the antenna array and the Z direction is normal to the plane of the antennas. A preferable overlapping is one that achieves a uniform antenna conductor spacing. The cross sectional view through $a_3$-$a_4$ shows the magnetic field directions 184 and 185 for the two antennas 181 and 182 respectively. A tag oriented to be powered in the X and Z directions is shown in positions 186 and 187 respectively. As the antennas array is sequentially switched there is a reliable field strength in the and Z directions above the antenna array regardless of the tag position above (or below) the antenna array.

The antenna array of FIG. 18(a) has 3 antennas 181, 182, 183 and would require 3 connecting cables to a reader. If the number of antennas in the array is increased to increase the size of the array then an additional connecting cable will be required for each additional antenna. The ever enlarging bundle of cables represents an additional cost and an installation difficulty.

FIGS. 10(a), 10(b), 11, 12 and 13 show example circuits suitable for RF switch control which are controlled using a single cable for conveying bidirectional RF signals and bidirectional data using a DC power signal. By incorporating RF switches directly into the antennas and RF switch control circuits, that use a single cable for conveying bidirectional RF signals and bidirectional data using a DC power signal, directly into the antenna array the bundle of connecting cables can be replaced with a single cable.

Figure 18B:
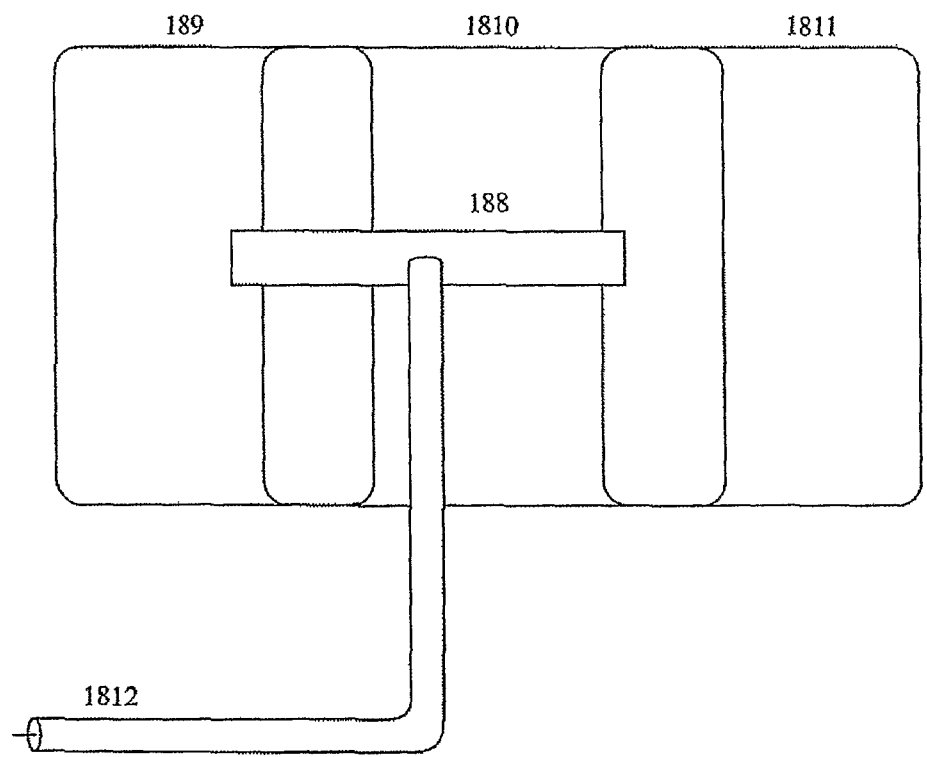

FIG. 18(b) shows an antenna array suitable for generating a sequentially switched interrogation field in at least two dimensions where an RF switch control circuit 188 as shown for example in FIGS. 10(a), 10(b), 11, 12 and 13 has been included. The switch control circuit 188 is controlled using a single cable 1812 for conveying bidirectional RF signals and bidirectional data using a DC power signal and each antenna 189, 1810 and 1811 incorporates individually or a combination of RF switches as shown for example in FIGS. 14, 15, 16(a) and 16(b). The antenna array has the same antenna pattern as shown in FIG. 18(a) to ensure reliable field strengths in the X and Z directions where the X direction is in the plane of the antenna array and the Z direction is normal to the plane of the antennas. Only one cable is required to connect to the antenna array which greatly reduces the cost and complexity of installation. Furthermore each port of a multi-port reader can now control one array where each array can consist of many antenna elements greatly increasing the total number of antennas connected to a single reader and reducing the number of readers required in an installation.

Figure 19A:
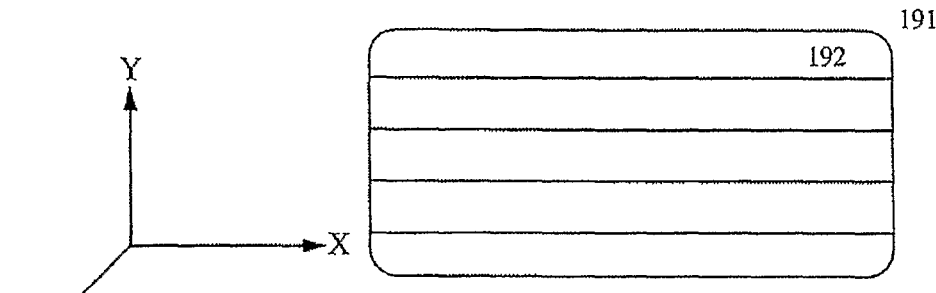
FIGS. 19(a), 19(b) 19(c) and 19(d) illustrate how two panels of parallel sequentially switched conductors when placed parallel to each other with the conductors orthogonally orientated will produce a three dimensional field.
Figure 19B:
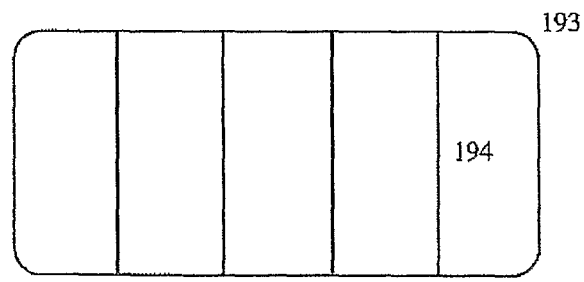
Figure 19C:
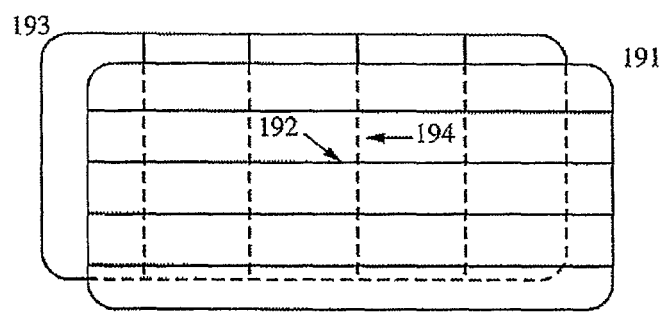

FIGS. 19(a), 19(b) and 19(c) illustrates how two panels of parallel sequentially switched conductors when placed parallel to each other with the conductors orthogonally orientated will produce a three dimensional field. These panels are constructed in accordance with the principles for constructing or operating sequentially switched parallel conductor explained above and shown in FIGS. 18(a) and 18(b). For FIGS. 19(a), 19(b) and 19(c) the X, Y and Z directions are; X horizontal left to right on the page, Y vertical up and down on the page, and Z in the third dimension coming directly out of the page surface.

The antenna panel 191 shown in FIG. 19(a) has parallel conductors 192 arranged in a horizontal direction and produced a field in the Y direction and in the Z direction. The conductors are suitably interconnected, but the connections are not shown as any suitable manner of coupling to a source of power and/or communications can be implemented.

The antenna panel 193 shown in FIG. 19(b) has parallel conductors 194 arranged in a vertical direction and produced a field in the X direction and in the Z direction. The conductors are suitably interconnected, but the connections are not shown as any suitable manner of coupling to a source of power and/or communications can be implemented.

Due to their planar construction the panels 191 and 193 can be place onto of each other as shown in FIG. 19(c). The panels are shown offset for clarity however this is not required for operation and the panels can be stacked directly on top of each other. The conductors in this composite panel are now sequentially switched such that only one coil or conductor set is active at a time. The composite panel will produce a field in the X, Y and Z directions as it is sequentially switched.

The antenna array of FIG. 19(c) would require a connecting cable between a reader and the antenna for each antenna. If the number of antennas in the array is increased to increase the size of the array then an additional connecting cable will be required for each additional antenna. The ever enlarging bundle of cables represents an additional cost and an installation difficulty.

FIGS. 10(a), 10(b), 11, 12 and 13 show example circuits suitable for RF switch control which are controlled using a single cable for conveying bidirectional RF signals and bidirectional data using a DC power signal. By incorporating RF switches directly into the antennas and RF switch control circuits, that use a single cable for conveying bidirectional RF signals and bidirectional data using a DC power signal, directly into the antenna array the bundle of connecting cables can be replaced with a single cable.

Figure 19D:
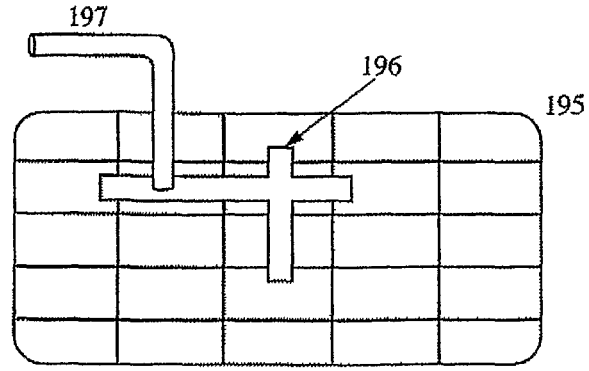

FIG. 19(d) shows, an antenna array 195 suitable for generating a sequentially switched interrogation field in three dimensions where an RF switch control circuit 196 as shown for example in FIGS. 10(a), 10(b), 11, 12 and 13 has been included. The array is a composite panel of orthogonally arranged conductors as shown in FIG. 19(c). The panels are shown offset in FIG. 19(c) for clarity however this is not required for operation and the panels can be stacked directly on top of each other as shown in FIG. 19(d). The switch control circuit 196 is controlled using a single cable 197 for conveying bidirectional RF signals and bidirectional data using a DC power signal and each antenna in the array 195 incorporates individually or a combination of RF switches as shown in FIGS. 14, 15, 16(a) and 16(b). The antenna array 195 has the same antenna pattern as shown in FIG. 19(c) to ensure reliable field strengths in the X, Y and Z directions. Only one cable is required to connect to the antenna array which greatly reduces the cost and complexity of installation. Furthermore each port of a multi-port reader can now control one array where each array can consist of many antenna elements greatly increasing the total number of antennas connected to a single reader and reducing the number of readers required in an installation.

Figure 20A:
FIGS. 20(a) and 20(b) show arrays of antennas suitable for generating a sequentially switched interrogation field where the arrays are connected to a reader by a single cable.
Figure 20B:
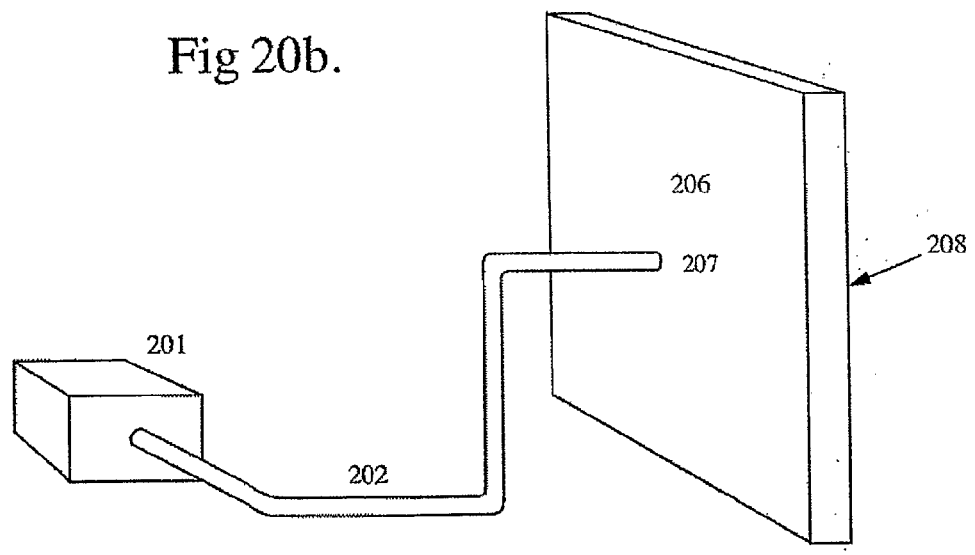

FIGS. 20(a) and 20(b) show an array of antennas suitable for generating a sequentially switched interrogation field where the array is connected to a reader 201 by a single cable 202.

FIG. 20(a) shows an array 203 where the cable entry 204 is from the side of the array. The antenna array has been encapsulated in a protection sleeve 205 manufactured, for example, from a light durable plastic such a "Firmex" an expanded PVC foam. Firmex is light and can be precisely machined to accommodate the antenna array and array components. A side entry antenna array is suited to applications where both the array and the connecting cable are to be placed on a flat surface.

FIG. 20(b) shows an array 206 where the cable entry 207 is from the surface of the array. The antenna array has been encapsulated in a protection sleeve 208 manufactured, for example, from a light durable plastic such a "Firmex" an expanded PVC foam. Firmex is light and can be precisely machined to accommodate the antenna array and array components. A surface entry antenna array is suited to applications where there is to be placed on a flat surface and the connecting cable is required to penetrate the mounting surface. This is applicable for example to table of wall fixings where the reader is located below the table or behind the wall.

Figure 21:
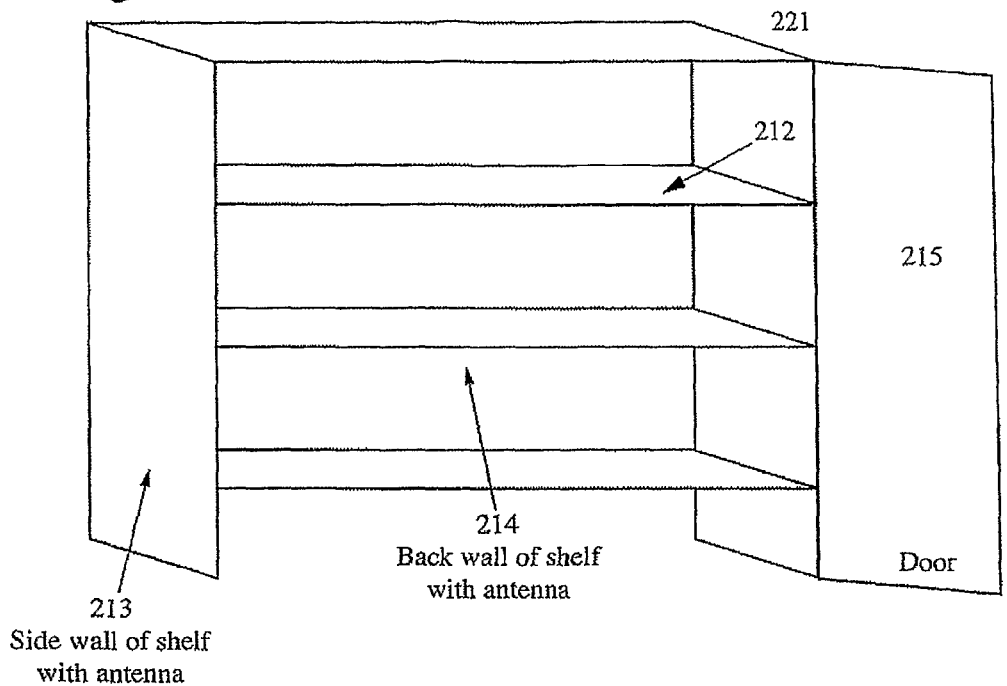
FIG. 21 shows an application for the invention where the invention is included in a shelving system.

FIG. 21 shows an application for the invention where the invention is included in a shelving system 211. The invention can be included in the shelves 212 and/or the side walls 213 and/or the back wall 214 and/or front door 215 of the shelving cabinet. The invention can provide two or three dimensional reading depending upon the placement of and direction of the conductors use. The invention can be made according to either or any of FIGS. 17(a), 17(b), 18(a), 18(b), 19(a), 19(b), 19(c) and 19(d).

Figure 22:
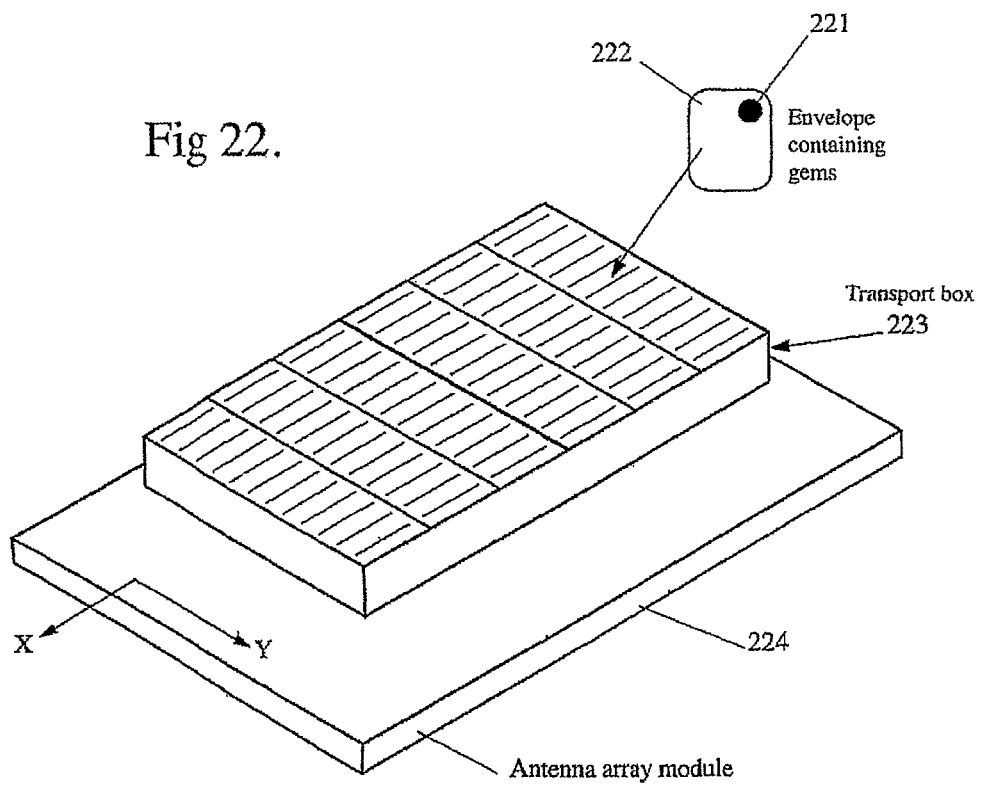
FIG. 22 shows another application for the invention where the invention is used to read closely stacked gem or jewellery transponders.

FIG. 22 shows another application for the invention where the invention is used to read closely stacked gem or jewellery transponders 221. Each gem or jewel is placed in a small envelope 222 that is place closely stacked in a transport and storage box 223. A transponder 221 is also placed in each envelope and identifies the gem or jewel. The transponder may also be programmed with information about the gem/jewel and/or be programmed with transport information. The contents of the box can be quickly read for stock take or security purposes by placing in on a panel 224 made according to either or any of FIGS. 17(a), 17(b), 18(a), 18(b), 19(a), 19(b), 19(c) and 19(d).

Figure 23:
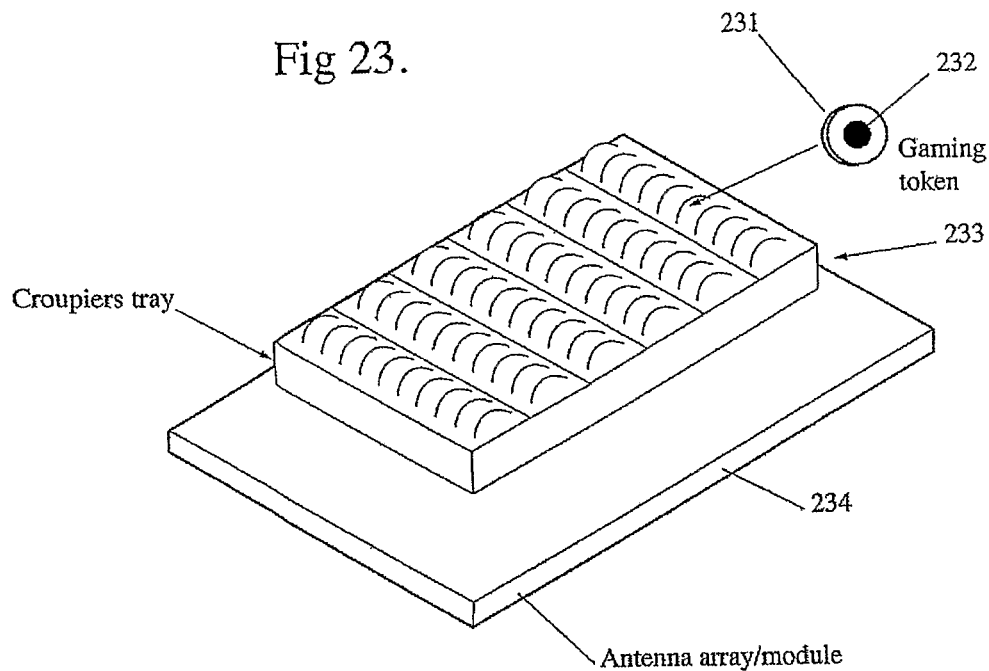
FIG. 23 shows still a further application for the invention where the invention is used to read closely stacked gaming tokens.

FIG. 23 shows still a further application for the invention where the invention is used to read closely stacked gaming tokens 231 which include an embedded transponder 232. Each token is placed closely stacked in a croupier's tray 233 for gaming, transport and storage. The transponder 232 identifies the token and may also be programmed with information about the token and/or owner of the token and/or transport information. The contents of the croupiers box 233 can be quickly read for operational, stock take or security purposes by placing in on a panel 234 made according to either or any of FIGS. 17(a), 17(b), 18(a), 18(b), 19(a), 19(b), 19(c) and 19(d).

Figure 24:
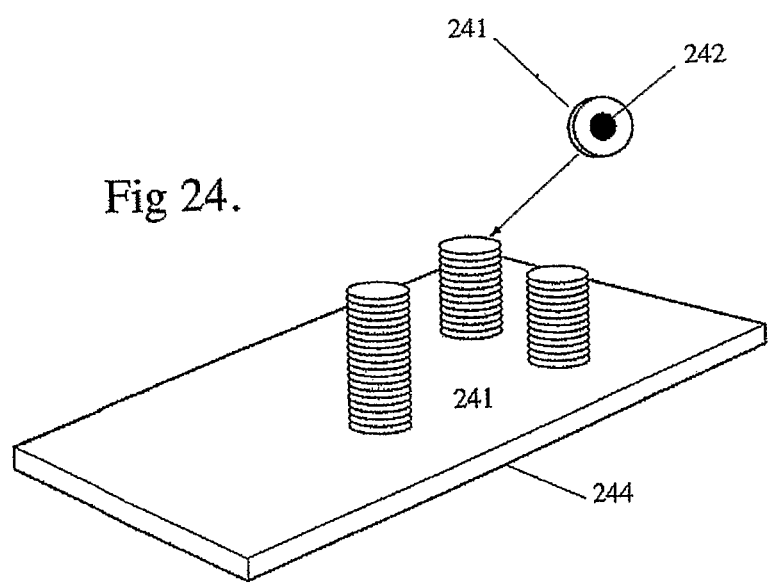
FIG. 24 shows still a further application for the invention where the invention is used to read closely stacked gaming tokens

FIG. 24 shows still a further application for the invention where the invention is used to read closely stacked gaming tokens 241 which include an embedded transponder 242. Each token is placed closely stacked in a vertical column 241 on table or tray 243 for gaming, transport or storage. The transponder 242 identifies the token and may also be programmed with information about the token and/or owner of the token and/or transport information. All of the tokens placed on the antenna 244 can be quickly read for operational, stock take or security purposes. The panel 244 being made according to either or any of FIGS. 17(a), 17(b), 18(a), 18(b), 19(a), 19(b), 19(c) and 19(d). This is a particularly advantageous interrogator antenna for roulette tables and mass storage systems for gaming tokens.

Figure 25:
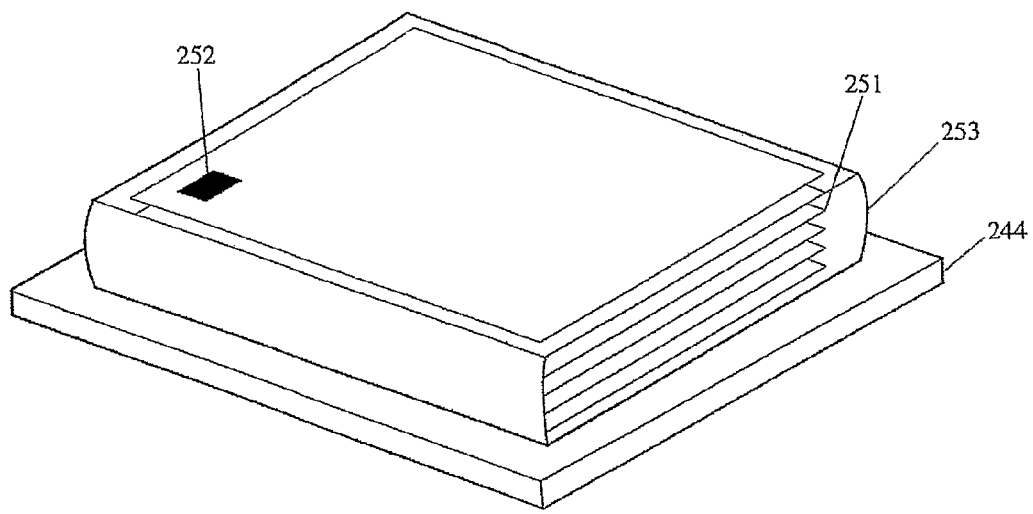
FIG. 25 shows still a further application for the invention where the invention is used to read closely stacked documents

FIG. 25 shows still a further application for the invention where the invention is used to read closely stacked document pages 251 which include an attached or embedded transponder 252. Each page is placed closely stacked in a vertical column 251 on a tray 253 for processing, transport or storage. The transponder 252 identifies the document page and may also be programmed with information about the page and/or owner of the page and/or transport information. All of the pages placed on the antenna 244 can be quickly read for operational, stock take or security purposes. The panel 244 being made according to either or any of FIGS. 17(a), 17(b), 18(a), 18(b), 19(a), 19(b), 19(c) and 19(d). This is a particularly advantageous interrogator antenna for offices and archive storage systems for documents.

Figure 26:
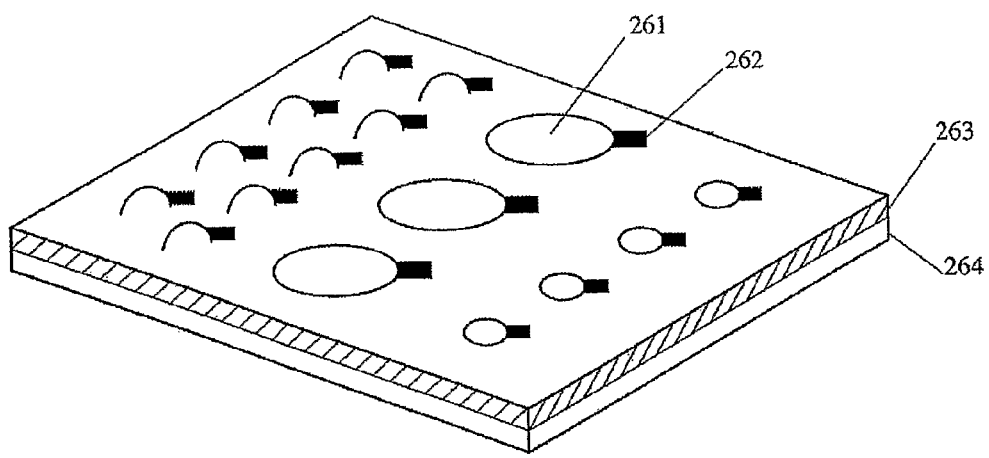
FIG. 26 shows still a further application for the invention where the invention is used to read displayed items

FIG. 26 shows still a further application for the invention where the invention is used to read displayed items of substantial value such as gems, jewellery or sunglasses 261 which include an embedded or attached transponder 262. Each displayed item is placed on a display tray 263 for display, sale, transport, stock take or storage. The transponder 262 identifies the display item 261 and may also be programmed with information about the item and/or owner of the item and/or value of the item and/or transport information. All of the display items placed on the antenna 264 can be quickly read for operational, stock take or security purposes. The panel 264 being made according to either or any of FIGS. 17(a), 17(b), 18(a), 18(b), 19(a), 19(b), 19(c) and 19(d). This is a particularly advantageous interrogator antenna for retail stores where items of value, such as gems, jewellery or sunglasses for example, are displayed for sale.

Figure 27:
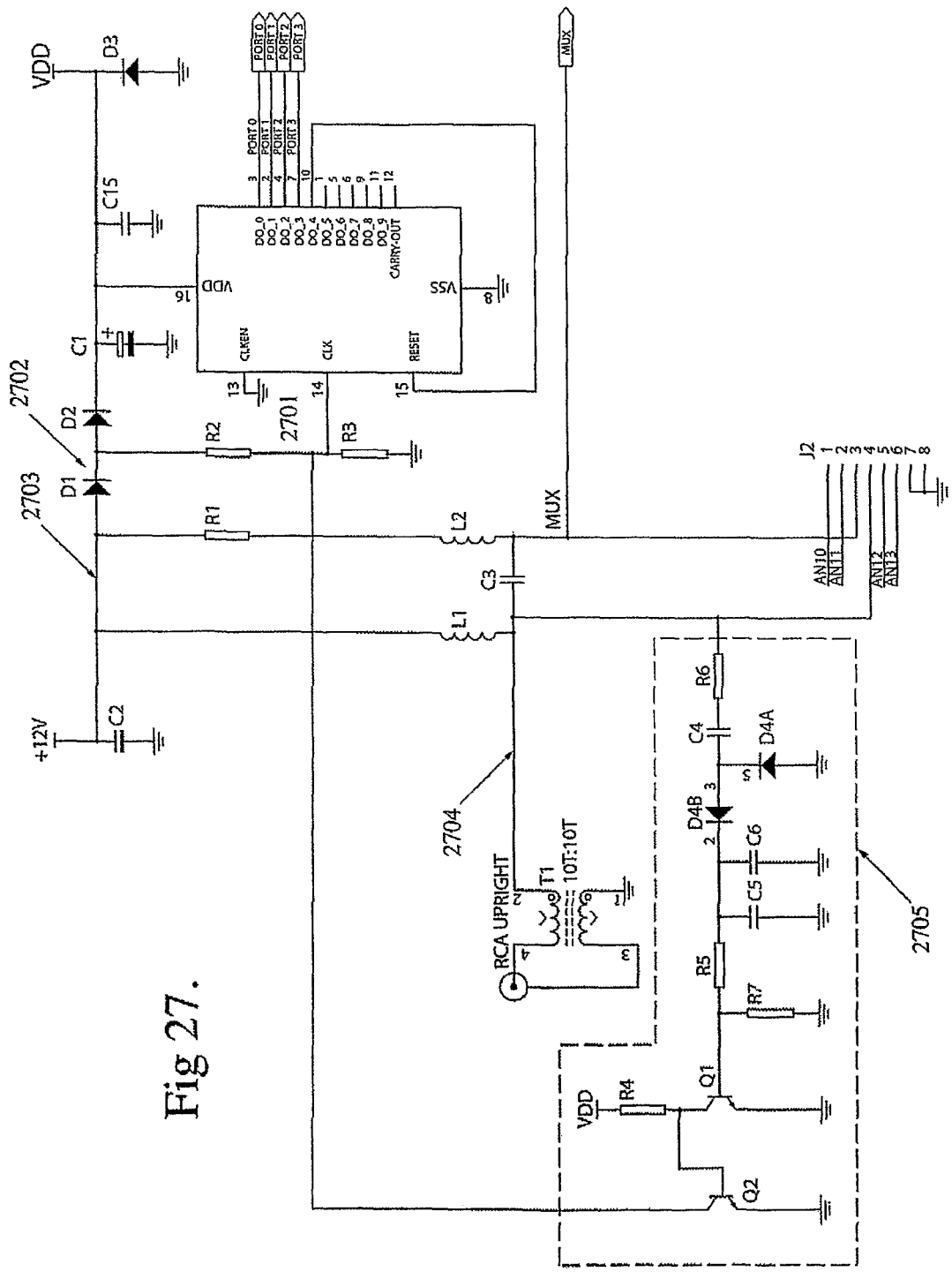
FIG. 27 illustrates an alternative communication method and FIG. 28 illustrates another alternative communication method.

With regard to FIG. 27, a communication method may be used between a $1^{st}$ & $2^{nd}$ device in which the $1^{st}$ device transmits a control or data signal to the $2^{nd}$ device using an RF signal which is modulated and/or switched. A corresponding receiving and/or demodulation circuitry is then provided in the $2^{nd}$ device in order to receive the control or data signals. In one form, the RE signal is switched off for short periods of time, and the envelope of the RF signal is detected by a diode peak detection circuit. FIG. 27 illustrates two alternative communication methods, either of which may be used. In a first method, a data signal 2701 is imposed on a DC power 2703, in which case, the signal 2701 is used (for example to clock the counter) via the DC peak detector 2702. In a second method, the data signal 2701 may be imposed on an AC signal 2704, in which case the signal 2701 is detected via AC peak detector 2705.

Figure 28:
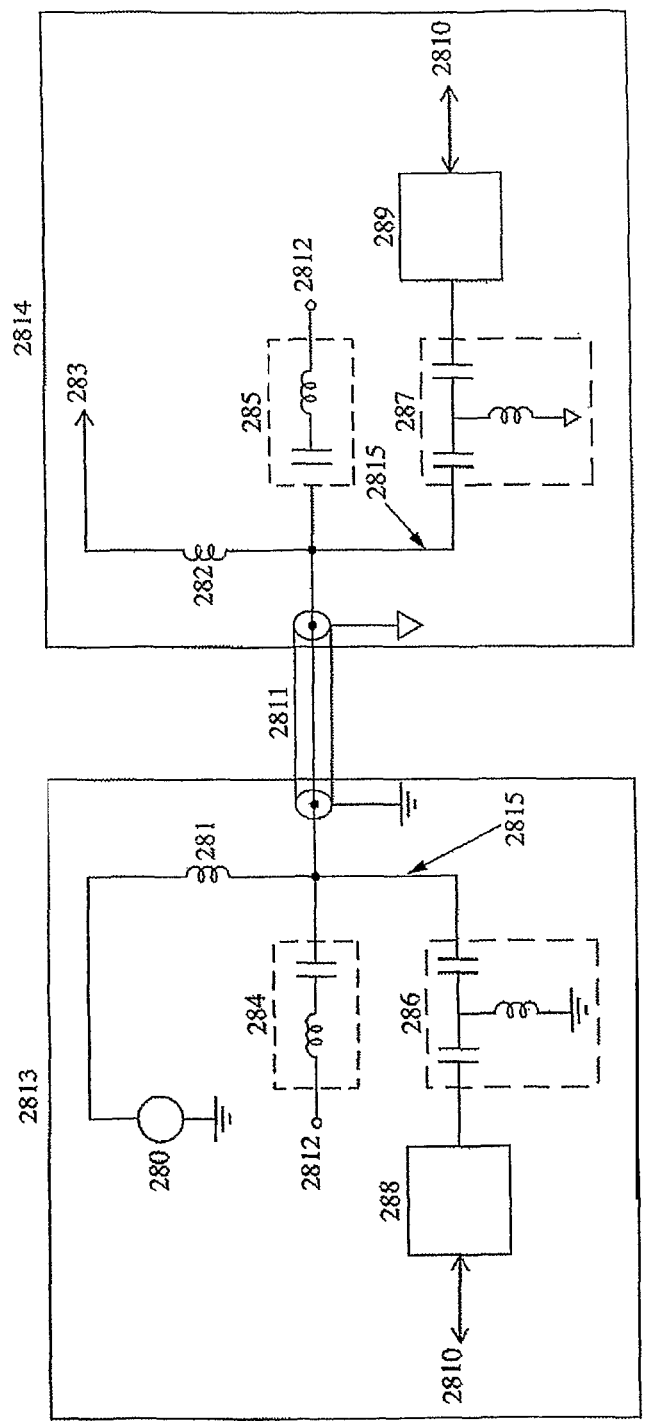

With regard to FIG. 28, a $1^{st}$ device 2813 is connected using a single cable 2811 to a $2^{nd}$ device 2814. A communication method may be used between a $1^{st}$ & $2^{nd}$ device in which the $1^{st}$ device transmits a control or data signal 2810 to the $2^{nd}$ device using a frequency for the control or data signal that is not the same as the frequency of the bidirectional RF signal 2812. The control or data signal is modulated using an RF modem 288 in the 1$^{st}$ device. A corresponding RF modem 289 is then provided in the 2$^{nd}$ device to receive and output the control or data signal 2810. In one form, the RE modems are low cost short range modems compliant with an IEEE 802.15.4 ZigBee™. Bidirectional data may be exchanged between the modems 288 and 289. Power 283 for the 2$^{nd}$ device is provided by the DC voltage source 280 and passes through the low pass filters formed by inductors 281 and 282. The RF signal 2812 passes through the band pass filters 284 and 285. The RF modulated control or data signal 2815 is passed through the high pass filters 286 and 287.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. The described embodiments are to be considered in all respects as illustrative only and not restrictive.

Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures. For example, although a nail and a screw may not be structural equivalents in that a nail employs a cylindrical surface to secure wooden parts together, whereas a screw employs a helical surface to secure wooden parts together, in the environment of fastening wooden parts, a nail and a screw are equivalent structures.

It should be noted that where the terms "server", "secure server" or similar terms are used herein, a communication device is described that may be used in a communication system, unless the context otherwise requires, and should not be construed to limit the present invention to any particular communication device type. Thus, a communication device may include, without limitation, a bridge, router, bridge-router (router), switch, node, or other communication device, which may or may not be secure.

It should also be noted that where a flowchart is used herein to demonstrate various aspects of the invention, it should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often, logic elements may be added, modified, omitted, performed in a different order, or implemented using different logic constructs (e.g., logic gates, looping primitives, conditional logic, and other logic constructs) without changing the overall results or otherwise departing from the true scope of the invention.

Various embodiments of the invention may be embodied in many different forms, including computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an exemplary embodiment of the present invention, predominantly all of the communication between users and the server is implemented as a set of computer program instructions that is converted into a computer executable form, stored as such in a computer readable medium, and executed by a microprocessor under the control of an operating system.

Computer program logic implementing all or part of the functionality where described herein may be embodied in various forms, including a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (eg, a RAM, ROM, PROM, EEPROM, or Flash-Programmable RAM), a magnetic memory device (e.g., a diskette or fixed disk), an optical memory device (e.g., a CD-ROM or DVD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and inter-networking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality where described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM or DVD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

"Comprises/comprising" when used in this specification is taken to specify the presence of stated features, integers, steps or components but does not preclude the presence or addition of one or more other features, integers, steps, components or groups thereof." Thus, unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

The claims defining the invention are as follows:

1. A communication method for enabling communication between a first device and a second device, the method comprising:
   providing a first signal representing a radio frequency (RF) signal;
   providing a second signal representing a power signal;
   providing a third signal representing at least one of a control signal and a data signal;
   providing a single cable for carrying the first, second and third signals;
   the third signal being carried on the second signal;
   providing a first layer of series parallel spaced conductors through which currents are sequentially switched to produce tangential and normal magnetic field components; and
   providing a second parallel layer of orthogonally oriented parallel spaced conductors that provide three-dimensional operations where currents are sequentially switched in both layers.

2. The method as claimed in claim 1, wherein the communication is unidirectional.

3. The method as claimed in claim 1, wherein the communication is bidirectional.

4. The method as claimed in claim 1, wherein the first device is a reader.

5. The method as claimed in claim 1, wherein the second device is at least one of a multiplexer (MUX) and at least one antenna.

6. The method as claimed in claim 1, wherein at least one of the first and second devices are used in radio frequency identification (RFID).

7. The method as claimed in claim 1, wherein the second signal is a DC power signal.

8. The method as claimed in claim 1, wherein the first signal is separated electrically from the second and third signals using frequency selective networks.

9. The method as claimed in claim 1, wherein the second device comprises at least one of a memory device, a logic device and a microcontroller connected to the single cable and is powered by and communicated with through the single cable.

10. The method as claimed in claim 1, wherein the second device comprises an array of antennas connected to the single cable and is powered by and communicated with through the single cable.

11. The method as claimed in claim 1, wherein the second device comprises a plurality of antennas or an array of antennas, each of which is less than ½ the size of the array, in order to reduce radiation emission.

12. The method as claimed in claim 10, wherein RF switching elements are provided to switch any one or any combination of antennas in the array.

13. The method as claimed in claim 12, wherein the switching elements are configured to enable an interrogation field in any of one, two or three dimensions to be produced.

14. A multiplexer (MUX) adapted for communication according to claim 1.

15. A reader adapted for communication according to the method of claim 1.

* * * * *

UNITED STATES PATENT AND TRADEMARK OFFICE
CERTIFICATE OF CORRECTION

| | |
|---|---|
| PATENT NO. | : 8,810,371 B2 |
| APPLICATION NO. | : 12/996035 |
| DATED | : August 19, 2014 |
| INVENTOR(S) | : Graham Alexander Munro Murdoch et al. |

It is certified that error appears in the above-identified patent and that said Letters Patent is hereby corrected as shown below:

On the Title Page
Item (73), Assignee:    Replace "Vicinity Pty Ltd" with
-- Sato Vicinity Pty Ltd --

Signed and Sealed this
Twenty-fifth Day of November, 2014

Michelle K. Lee
*Deputy Director of the United States Patent and Trademark Office*